US012674995B2

(12) United States Patent
Wang et al.

(10) Patent No.: US 12,674,995 B2
(45) Date of Patent: Jul. 7, 2026

(54) SPECTRALLY SHAPED LIGHT SOURCE

(71) Applicants: Hamamatsu Photonics K.K., Shizuoka (JP); Energetiq Technology, Inc., Wilmington, MA (US)

(72) Inventors: Qingsong Wang, Lexington, MA (US); Kosuke Saito, Hamamatsu-shi (JP); Alexander Cutler, Hopkinton, MA (US); Jonathan P. Murray, Chelmsford, MA (US); Donald L. McDaniel, North Andover, MA (US); Huiling Zhu, Lexington, MA (US)

(73) Assignees: Hamamatsu Photonics K.K., Shizuoka (JP); Energetiq Technology, Inc., Wilmington, DE (US)

( * ) Notice: Subject to any disclaimer, the term of this patent is extended or adjusted under 35 U.S.C. 154(b) by 772 days.

(21) Appl. No.: 17/577,168

(22) Filed: Jan. 17, 2022

(65) Prior Publication Data

US 2022/0229307 A1 Jul. 21, 2022

Related U.S. Application Data

(60) Provisional application No. 63/140,145, filed on Jan. 21, 2021.

(51) Int. Cl.
G02B 27/10 (2006.01)
G02B 26/00 (2006.01)
(52) U.S. Cl.
CPC ....... G02B 27/1006 (2013.01); G02B 26/007 (2013.01)
(58) Field of Classification Search
CPC ...... G01J 3/0208; G01J 3/0216; G01J 3/0229; G01J 3/12; G01J 3/18; G01J 2003/1204;
(Continued)

(56) References Cited

U.S. PATENT DOCUMENTS

| | | | |
|---|---|---|---|
| 3,054,921 A | 9/1962 | Lye | |
| 3,227,923 A | 1/1966 | Marrison | |

(Continued)

FOREIGN PATENT DOCUMENTS

| | | |
|---|---|---|
| CN | 1509419 A | 6/2004 |
| CN | 210533985 U | 5/2020 |

(Continued)

OTHER PUBLICATIONS

US 8,471,227 B2, 06/2013, Kakizaki (withdrawn)
(Continued)

*Primary Examiner* — Bumsuk Won
*Assistant Examiner* — Samanvitha Sridhar
(74) *Attorney, Agent, or Firm* — Rauschenbach Patent Law Group, PLLC; Kurt Rauschenbach

(57) ABSTRACT

A spectrally-shaped source includes a source that generates a round beam. An optical element transforms the round beam to a rectangular beam. An image forming dispersive device angularly disperses wavelengths and images the rectangular beam at a modulation plane. A pixelated SLM is illuminated by the dispersed wavelengths of the rectangular beam such that each column of illuminated pixels is illuminated by a different wavelength. Toroidal optics projects light directed from the SLM to an output plane and focuses the angularly dispersed wavelengths of the beam so that a selected portion of the optical beam is reflected toward the toroidal optic by the SLM. A controller instructs the pixelated SLM to selectively reflect the portion of the optical beam toward the toroidal optic and to selectively reflect another portion of the beam away from the toroidal optic so as to provide a desired spectral shape.

19 Claims, 21 Drawing Sheets

(58) Field of Classification Search

CPC ....... G01J 2003/1269; G01J 2003/1278; G01J 2003/1282; G02F 1/011; G02F 1/0134; G02F 1/13318; G02F 1/23; G02F 1/3528; G02B 27/1006; G02B 27/1026; G02B 27/1033; G02B 27/1046; G02B 17/0642; G02B 17/0663; G02B 17/0673; G02B 17/0816; G02B 17/0848; G02B 17/0868; G02B 17/0888; G02B 3/06; G02B 26/007; G02B 26/103; G02B 6/00; G05B 2219/00

See application file for complete search history.

(56) References Cited

U.S. PATENT DOCUMENTS

| | | |
|---|---|---|
| 3,418,507 A | 12/1968 | Young |
| 3,427,564 A | 2/1969 | Okaya |
| 3,495,118 A | 2/1970 | Richter |
| 3,502,929 A | 3/1970 | Richter |
| 3,582,822 A | 6/1971 | Kamey |
| 3,619,588 A | 11/1971 | Chambers |
| 3,636,395 A | 1/1972 | Banes, Jr. |
| 3,641,389 A | 2/1972 | Leidigh |
| 3,657,588 A | 4/1972 | McRae |
| 3,731,133 A | 5/1973 | McRae |
| 3,764,466 A | 10/1973 | Dawson |
| 3,808,496 A | 4/1974 | McRae |
| 3,826,996 A | 7/1974 | Jaegle et al. |
| 3,900,803 A | 8/1975 | Silfvast et al. |
| 3,911,318 A | 10/1975 | Spero |
| 3,949,258 A | 4/1976 | Soodak |
| 3,982,201 A | 9/1976 | Rosenkrantz et al. |
| 4,054,812 A | 10/1977 | Lossner |
| 4,063,803 A | 12/1977 | Wright |
| 4,088,966 A | 5/1978 | Samis |
| 4,152,625 A | 5/1979 | Conrad |
| 4,177,435 A | 12/1979 | Brown |
| 4,179,037 A | 12/1979 | Chan |
| 4,179,566 A | 12/1979 | Nadelson |
| 4,263,095 A | 4/1981 | Thode |
| 4,272,681 A | 6/1981 | Fill |
| 4,485,333 A | 11/1984 | Goldbert |
| 4,498,029 A | 2/1985 | Yoshizawa et al. |
| 4,536,640 A | 8/1985 | Vukanovic |
| 4,599,540 A | 7/1986 | Roberts |
| 4,633,128 A | 12/1986 | Roberts |
| 4,646,215 A | 2/1987 | Levin et al. |
| 4,702,716 A | 10/1987 | Roberts |
| 4,724,352 A | 2/1988 | Schuda |
| RE32,626 E | 3/1988 | Yoshizawa et al. |
| 4,730,895 A | 3/1988 | Siedband et al. |
| 4,780,608 A | 10/1988 | Cross et al. |
| 4,785,216 A | 11/1988 | Roberts |
| 4,789,788 A | 12/1988 | Cox |
| 4,866,517 A | 9/1989 | Mohizuki |
| 4,868,458 A | 9/1989 | Davenport et al. |
| 4,872,189 A | 10/1989 | Frankel |
| 4,889,605 A | 12/1989 | Asmus |
| 4,901,330 A | 2/1990 | Wolfram et al. |
| 4,978,893 A | 12/1990 | Brannon |
| 5,052,780 A | 10/1991 | Klein |
| 5,153,673 A | 10/1992 | Amirav |
| 5,299,279 A | 3/1994 | Roberts |
| 5,317,618 A | 5/1994 | Nakahara |
| 5,334,913 A | 8/1994 | Ury et al. |
| 5,359,621 A | 10/1994 | Tsunoda |
| 5,418,420 A | 5/1995 | Roberts |
| 5,442,184 A | 8/1995 | Palmer et al. |
| 5,506,857 A | 4/1996 | Meinzer |
| 5,508,934 A | 4/1996 | Moslehi |
| 5,561,338 A | 10/1996 | Roberts |
| 5,672,931 A | 9/1997 | Kiss |
| 5,686,996 A | 11/1997 | Fidler et al. |
| 5,789,863 A | 8/1998 | Takahashi |
| 5,790,575 A | 8/1998 | Zamel et al. |
| 5,801,495 A | 9/1998 | Smolka et al. |
| 5,903,088 A | 5/1999 | Sugitani |
| 5,905,268 A | 5/1999 | Garcia |
| 5,921,311 A | 7/1999 | Menendez et al. |
| 5,940,182 A | 8/1999 | Lepper |
| 6,005,332 A | 12/1999 | Mercer |
| 6,025,916 A | 2/2000 | Quick |
| 6,046,808 A | 4/2000 | Fateley |
| 6,061,379 A | 5/2000 | Schoen |
| 6,074,516 A | 6/2000 | Howald |
| 6,108,091 A | 8/2000 | Pecen |
| 6,128,078 A | 10/2000 | Fateley |
| 6,129,807 A | 10/2000 | Grimbergen |
| 6,181,053 B1 | 1/2001 | Roberts |
| 6,184,517 B1 | 2/2001 | Sawada et al. |
| 6,200,005 B1 | 3/2001 | Roberts |
| 6,212,989 B1 | 4/2001 | Beyer |
| 6,236,147 B1 | 5/2001 | Manning |
| 6,265,813 B1 | 7/2001 | Knox |
| 6,274,970 B1 | 8/2001 | Capobianco |
| 6,275,565 B1 | 8/2001 | Tomie |
| 6,281,629 B1 | 8/2001 | Tanaka |
| 6,285,131 B1 | 9/2001 | Kiss |
| 6,288,780 B1 | 9/2001 | Fairey et al. |
| 6,316,867 B1 | 11/2001 | Roberts |
| 6,331,993 B1 | 12/2001 | Brown |
| 6,339,279 B1 | 1/2002 | Miyamoto |
| 6,339,280 B1 | 1/2002 | Miyamoto |
| 6,351,058 B1 | 2/2002 | Roberts |
| 6,374,012 B1 | 4/2002 | Bergmann et al. |
| 6,400,067 B1 | 6/2002 | Manning |
| 6,400,089 B1 | 6/2002 | Salvermoser |
| 6,414,436 B1 | 7/2002 | Eastlund |
| 6,417,625 B1 | 7/2002 | Brooks et al. |
| 6,445,134 B1 | 9/2002 | Asmus |
| 6,493,364 B1 | 12/2002 | Baumler et al. |
| 6,504,319 B2 | 1/2003 | Herter |
| 6,504,903 B1 | 1/2003 | Kondo |
| 6,532,100 B1 | 3/2003 | Partanen |
| 6,541,924 B1 | 4/2003 | Kane et al. |
| 6,597,087 B2 | 7/2003 | Roberts |
| 6,602,104 B1 | 8/2003 | Roberts |
| 6,670,758 B2 | 12/2003 | Beech |
| 6,737,809 B2 | 5/2004 | Espiau |
| 6,762,849 B1 | 7/2004 | Rulkens |
| 6,768,264 B2 | 7/2004 | Beech |
| 6,781,681 B2 | 8/2004 | Horwitz |
| 6,781,691 B2 | 8/2004 | MacKinnon et al. |
| 6,788,404 B2 | 9/2004 | Lange |
| 6,788,416 B2 | 9/2004 | Reuter |
| 6,795,182 B2 * | 9/2004 | Rakuljic ........... G02B 6/29398 356/328 |
| 6,816,323 B2 | 11/2004 | Colin et al. |
| 6,821,377 B2 | 11/2004 | Saito |
| 6,834,984 B2 | 12/2004 | Tausch |
| 6,865,255 B2 | 3/2005 | Richardson |
| 6,867,419 B2 | 3/2005 | Tajima |
| 6,914,919 B2 | 7/2005 | Watson |
| 6,956,329 B2 | 10/2005 | Brooks et al. |
| 6,956,885 B2 | 10/2005 | Taylor |
| 6,970,492 B2 | 11/2005 | Govorkov |
| 6,972,421 B2 | 12/2005 | Melnychuk et al. |
| 7,019,883 B2 | 3/2006 | Moon et al. |
| 7,050,149 B2 | 5/2006 | Owa et al. |
| 7,072,367 B2 | 7/2006 | Arisawa |
| 7,087,914 B2 | 8/2006 | Akins et al. |
| 7,158,221 B2 | 1/2007 | Davis |
| 7,164,144 B2 | 1/2007 | Partio et al. |
| 7,176,633 B1 | 2/2007 | Roberts |
| 7,274,435 B2 | 9/2007 | Hiura |
| 7,307,375 B2 | 12/2007 | Smith et al. |
| 7,368,741 B2 | 5/2008 | Melnychuk |
| 7,399,981 B2 | 7/2008 | Cheymol et al. |
| 7,427,167 B2 | 9/2008 | Holder et al. |
| 7,429,818 B2 | 9/2008 | Chang et al. |
| 7,435,982 B2 | 10/2008 | Smith |
| 7,439,497 B2 | 10/2008 | Dantus |
| 7,439,530 B2 | 10/2008 | Ershov |

(56) References Cited

U.S. PATENT DOCUMENTS

| | | | |
|---|---|---|---|
| 7,456,417 B2 | 11/2008 | Murakami et al. | |
| 7,567,607 B2 | 7/2009 | Knowles et al. | |
| 7,598,509 B2 | 10/2009 | Ershov | |
| 7,632,419 B1 | 12/2009 | Grimgergen | |
| 7,652,430 B1 | 1/2010 | Delgado | |
| 7,671,349 B2 | 3/2010 | Bykanov | |
| 7,679,027 B2 | 3/2010 | Bogatu | |
| 7,679,276 B2 | 3/2010 | Blondia | |
| 7,680,158 B2 | 3/2010 | Endo | |
| 7,705,331 B1 | 4/2010 | Kirk et al. | |
| 7,773,656 B1 | 8/2010 | Mills | |
| 7,786,455 B2 | 8/2010 | Smith | |
| 7,795,816 B2 | 9/2010 | Jennings et al. | |
| 7,796,319 B2 | 9/2010 | MacKinnon et al. | |
| 8,003,963 B2 | 8/2011 | Nagai et al. | |
| 8,018,589 B2 | 9/2011 | MacKinnon et al. | |
| 8,143,790 B2 | 3/2012 | Smith | |
| 8,148,900 B1 | 4/2012 | Kirk et al. | |
| 8,242,671 B2 | 8/2012 | Blondia | |
| 8,242,695 B2 | 8/2012 | Sumitomo | |
| 8,253,926 B2 | 8/2012 | Sumitomo | |
| 8,309,943 B2 | 11/2012 | Smith | |
| 8,320,424 B2 | 11/2012 | Bolt | |
| 8,427,067 B2 | 4/2013 | Espiau | |
| 8,436,630 B2 | 5/2013 | Fong et al. | |
| 8,525,138 B2 | 9/2013 | Smith et al. | |
| 8,570,635 B2 | 10/2013 | MacKinnon et al. | |
| 8,710,475 B2 | 4/2014 | Komori et al. | |
| 8,969,841 B2 | 3/2015 | Smith | |
| 9,048,000 B2 | 6/2015 | Smith | |
| 9,182,278 B2 | 11/2015 | Day | |
| 9,185,786 B2 | 11/2015 | Smith | |
| 9,576,785 B2 | 2/2017 | Blondia | |
| 9,609,732 B2 | 3/2017 | Smith | |
| 9,678,262 B2 | 6/2017 | Görtz et al. | |
| 9,741,553 B2 | 8/2017 | Blondia | |
| 9,748,086 B2 | 8/2017 | Blondia | |
| 9,922,814 B2 | 3/2018 | Blondia | |
| 10,006,865 B1 | 6/2018 | Shaughnessy et al. | |
| 10,008,378 B2 | 6/2018 | Blondia | |
| 10,057,973 B2 | 8/2018 | Blondia | |
| 10,078,167 B2 | 9/2018 | Brune et al. | |
| 10,109,473 B1 | 10/2018 | Blondia et al. | |
| 10,186,414 B2 | 1/2019 | Blondia | |
| 10,186,416 B2 | 1/2019 | Biondia | |
| 10,203,247 B2 | 2/2019 | Brady et al. | |
| 10,217,625 B2 | 2/2019 | Bezel et al. | |
| 10,222,701 B2 | 3/2019 | Zhao et al. | |
| 10,770,282 B1 | 9/2020 | Abramenko et al. | |
| 10,964,523 B1 | 3/2021 | Gayasov et al. | |
| 11,784,037 B2 | 10/2023 | Partlow et al. | |
| 12,014,918 B2 | 6/2024 | Partlow et al. | |
| 12,144,072 B2 | 11/2024 | Partlow et al. | |
| 12,156,322 B2 | 11/2024 | Niell, III et al. | |
| 12,165,856 B2 | 12/2024 | Horne et al. | |
| 2001/0035720 A1 | 11/2001 | Guthrie | |
| 2002/0021508 A1 | 2/2002 | Ishihara | |
| 2002/0036820 A1 | 3/2002 | Merriam | |
| 2002/0044624 A1 | 4/2002 | Davis et al. | |
| 2002/0044629 A1 | 4/2002 | Hertz et al. | |
| 2002/0080834 A1 | 6/2002 | Kusunose | |
| 2002/0172235 A1 | 11/2002 | Chang et al. | |
| 2003/0006383 A1 | 1/2003 | Melnychuk | |
| 2003/0034736 A1 | 2/2003 | Eastlund | |
| 2003/0052609 A1 | 3/2003 | Eastlund et al. | |
| 2003/0068012 A1 | 4/2003 | Ahmad et al. | |
| 2003/0086139 A1 | 5/2003 | Wing So | |
| 2003/0090902 A1 | 5/2003 | Kavanaugh | |
| 2003/0147499 A1 | 8/2003 | Kondo | |
| 2003/0168982 A1 | 9/2003 | Kim | |
| 2003/0193281 A1 | 10/2003 | Manning | |
| 2003/0231496 A1 | 12/2003 | Sato et al. | |
| 2004/0008433 A1 | 1/2004 | Margeson | |
| 2004/0016894 A1 | 1/2004 | Wester | |
| 2004/0018647 A1 | 1/2004 | Jones | |
| 2004/0026512 A1 | 2/2004 | Otsubo | |
| 2004/0071267 A1 | 4/2004 | Jacob et al. | |
| 2004/0084406 A1 | 5/2004 | Kamp | |
| 2004/0108473 A1 | 6/2004 | Melnychuk | |
| 2004/0129896 A1 | 7/2004 | Schmidt et al. | |
| 2004/0134426 A1 | 7/2004 | Tomoyasu | |
| 2004/0183031 A1 | 9/2004 | Silverman | |
| 2004/0183038 A1 | 9/2004 | Hiramoto et al. | |
| 2004/0238762 A1 | 12/2004 | Mizoguchi et al. | |
| 2004/0239894 A1 | 12/2004 | Shimada | |
| 2004/0245350 A1 | 12/2004 | Zeng | |
| 2004/0264512 A1 | 12/2004 | Hartlove et al. | |
| 2005/0057158 A1 | 3/2005 | Chang et al. | |
| 2005/0167618 A1 | 8/2005 | Hoshino et al. | |
| 2005/0168148 A1 | 8/2005 | Allen | |
| 2005/0199829 A1 | 9/2005 | Partlo et al. | |
| 2005/0205803 A1 | 9/2005 | Mizoguchi | |
| 2005/0205811 A1 | 9/2005 | Partlo et al. | |
| 2005/0207454 A1 | 9/2005 | Starodoumov | |
| 2005/0225739 A1 | 10/2005 | Hiura | |
| 2005/0243390 A1 | 11/2005 | Tejnil | |
| 2005/0270528 A1 | 12/2005 | Geshwind et al. | |
| 2005/0276285 A1 | 12/2005 | Huang et al. | |
| 2006/0017387 A1 | 1/2006 | Smith | |
| 2006/0039435 A1 | 2/2006 | Cheymol et al. | |
| 2006/0078017 A1 | 4/2006 | Endo et al. | |
| 2006/0103952 A1* | 5/2006 | Gouch | G02B 27/46 |
| | | | 359/737 |
| 2006/0131515 A1 | 6/2006 | Partlo et al. | |
| 2006/0152128 A1 | 7/2006 | Manning | |
| 2006/0176925 A1 | 8/2006 | Nakano | |
| 2006/0186356 A1 | 8/2006 | Imai et al. | |
| 2006/0192152 A1 | 8/2006 | Ershov et al. | |
| 2006/0202625 A1 | 9/2006 | Song | |
| 2006/0215712 A1 | 9/2006 | Ziener | |
| 2006/0219957 A1 | 10/2006 | Ershov et al. | |
| 2006/0228072 A1* | 10/2006 | Davis | G02B 6/29313 |
| | | | 385/24 |
| 2006/0255298 A1 | 11/2006 | Bykanov | |
| 2007/0001131 A1 | 1/2007 | Ershov | |
| 2007/0210717 A1 | 9/2007 | Smith | |
| 2007/0228288 A1 | 10/2007 | Smith | |
| 2007/0228300 A1 | 10/2007 | Smith | |
| 2007/0285921 A1 | 12/2007 | Zulim et al. | |
| 2008/0048133 A1 | 2/2008 | Bykanov | |
| 2008/0055712 A1 | 3/2008 | Noelscher | |
| 2008/0059096 A1 | 3/2008 | Stenstrom | |
| 2008/0099699 A1 | 5/2008 | Yabuta | |
| 2008/0260335 A1 | 10/2008 | Laitala et al. | |
| 2009/0032740 A1 | 2/2009 | Smith et al. | |
| 2009/0091273 A1 | 4/2009 | Horioka | |
| 2009/0196801 A1 | 8/2009 | Mills | |
| 2009/0267003 A1 | 10/2009 | Moriya | |
| 2009/0314967 A1 | 12/2009 | Moriya | |
| 2010/0164380 A1 | 7/2010 | Sumitomo | |
| 2010/0172014 A1 | 7/2010 | Yabuta | |
| 2010/0181503 A1 | 7/2010 | Yanagida | |
| 2010/0253935 A1 | 10/2010 | Mackinnon et al. | |
| 2010/0264820 A1 | 10/2010 | Sumitomo | |
| 2011/0181191 A1 | 7/2011 | Smith et al. | |
| 2011/0204265 A1 | 8/2011 | Smith et al. | |
| 2011/0291566 A1 | 12/2011 | Bezel | |
| 2013/0234597 A1 | 9/2013 | Kusunose et al. | |
| 2013/0342105 A1 | 12/2013 | Shchemelinin et al. | |
| 2014/0071406 A1* | 3/2014 | Manni | G03B 21/2033 |
| | | | 353/31 |
| 2014/0117258 A1 | 5/2014 | Smith | |
| 2014/0197733 A1 | 7/2014 | Delgado | |
| 2014/0268127 A1 | 9/2014 | Day | |
| 2015/0021500 A1 | 1/2015 | Smith | |
| 2015/0034838 A1 | 2/2015 | Bezel et al. | |
| 2015/0131137 A1 | 5/2015 | Burry et al. | |
| 2015/0289353 A1 | 10/2015 | Smith | |
| 2016/0057845 A1 | 2/2016 | Smith | |
| 2016/0093463 A1 | 3/2016 | Bhattacharjee et al. | |
| 2017/0052118 A1* | 2/2017 | Loock | G01J 3/021 |
| 2017/0135192 A1 | 5/2017 | Blondia | |
| 2017/0150590 A1 | 5/2017 | Chimmalgi et al. | |
| 2017/0213704 A1 | 7/2017 | Chen | |

(56) References Cited

U.S. PATENT DOCUMENTS

| | | |
|---|---|---|
| 2019/0021158 A1 | 1/2019 | Nozaki |
| 2019/0037676 A1 | 1/2019 | Khodykin et al. |
| 2019/0045615 A1 | 2/2019 | Mon et al. |
| 2019/0053364 A1 | 2/2019 | Mori et al. |
| 2019/0075641 A1 | 3/2019 | Kuritsyn et al. |
| 2019/0302570 A1* | 10/2019 | Kumar ................... G02F 1/365 |
| 2020/0012165 A1 | 1/2020 | Haller |
| 2020/0051785 A1 | 2/2020 | Miller et al. |
| 2020/0393687 A1 | 12/2020 | Yabu et al. |
| 2021/0112647 A1* | 4/2021 | Coleman ............... H05B 45/12 |
| 2021/0120659 A1 | 4/2021 | Szilagyi et al. |
| 2021/0282256 A1 | 9/2021 | Abramenko et al. |
| 2022/0375740 A1 | 11/2022 | Partlow et al. |
| 2023/0178357 A1 | 6/2023 | Partlow et al. |
| 2023/0268167 A1 | 8/2023 | Horne et al. |
| 2023/0319959 A1 | 10/2023 | Partlow et al. |
| 2023/0420242 A1 | 12/2023 | Partlow et al. |
| 2024/0194454 A1 | 6/2024 | Smith et al. |
| 2024/0196506 A1 | 6/2024 | Niell, III et al. |
| 2024/0297035 A1 | 9/2024 | Partlow et al. |
| 2024/0401775 A1 | 12/2024 | Wang et al. |

FOREIGN PATENT DOCUMENTS

| | | |
|---|---|---|
| DE | 19910725 A1 | 10/1999 |
| DE | 102011113681 A1 | 3/2013 |
| DE | 10-2019-107924 A1 | 10/2020 |
| EP | 0151188 A | 11/1991 |
| EP | 1083777 A9 | 3/2001 |
| EP | 1397030 A1 | 3/2004 |
| EP | 1313128 B1 | 5/2011 |
| EP | 2469250 A2 | 6/2012 |
| FR | 1471215 A | 3/1967 |
| FR | 2554302 A1 | 5/1985 |
| GB | 2266406 A | 10/1993 |
| JP | 53-103395 A | 9/1978 |
| JP | 61-193358 A | 8/1986 |
| JP | 1-298560 A | 11/1989 |
| JP | 4-144053 A | 5/1992 |
| JP | 05-061397 A | 3/1993 |
| JP | 5-82087 A | 4/1993 |
| JP | H05-82087 B2 | 11/1993 |
| JP | 8-299951 A | 11/1996 |
| JP | 9-288995 A | 11/1997 |
| JP | 2003-317675 A | 11/2003 |
| JP | 2004-134166 A | 4/2004 |
| JP | 2006-010675 A | 1/2006 |
| JP | 2006-080255 A | 3/2006 |
| JP | 2006-194925 A | 7/2006 |
| JP | 2007-506947 A | 3/2007 |
| JP | 4255662 B2 | 4/2009 |
| JP | 2010-087388 A | 4/2010 |
| JP | 2010-171159 A | 8/2010 |
| JP | 2011-023712 A | 2/2011 |
| JP | 2011-048285 A | 3/2011 |
| JP | 2012-018415 A | 1/2012 |
| JP | 2015-519605 A | 7/2015 |
| JP | 2015-166757 A | 9/2015 |
| JP | 25346372 B1 | 6/2016 |
| JP | 2016-138989 A | 8/2016 |
| JP | 6243845 B2 | 12/2017 |
| KR | 10-2001-0062437 A | 7/2001 |
| KR | 10-2005-0003392 A | 1/2005 |
| KR | 10-2006-0064319 A | 6/2006 |
| KR | 10-2006-0087004 A | 8/2006 |
| KR | 10-2008-0108111 A | 12/2008 |
| KR | 10-2010-0114455 A | 10/2010 |
| KR | 10-1269115 B1 | 5/2013 |
| KR | 10-2016-0071231 A | 6/2016 |
| KR | 10-1639963 B1 | 7/2016 |
| KR | 10-2020-0017137 A | 2/2020 |
| NL | 8403294 A | 6/1985 |
| RU | 2266628 C2 | 12/2005 |
| RU | 2278483 C2 | 6/2006 |
| RU | 2326463 C2 | 6/2008 |
| RU | 2780202 C1 | 9/2022 |
| WO | 94/10729 A1 | 5/1994 |
| WO | 98/11388 A1 | 3/1998 |
| WO | 98/54611 A2 | 12/1998 |
| WO | 99/18594 A1 | 4/1999 |
| WO | 02/087291 A2 | 10/2002 |
| WO | 03/079391 A2 | 9/2003 |
| WO | 2004/023061 A2 | 3/2004 |
| WO | 2004/084592 A2 | 9/2004 |
| WO | 2004/097520 A2 | 11/2004 |
| WO | 2005/004555 A2 | 1/2005 |
| WO | 2006/017119 A2 | 2/2006 |
| WO | 2007/002170 A2 | 1/2007 |
| WO | 2010/093903 A2 | 8/2010 |
| WO | 2018/136683 A1 | 7/2018 |
| WO | 2019/023150 A1 | 1/2019 |
| WO | 2019/023303 A1 | 1/2019 |
| WO | 2022/251000 A1 | 12/2022 |
| WO | 2023/158909 A1 | 8/2023 |
| WO | 2023/192696 A1 | 10/2023 |
| WO | 2024/123564 A1 | 6/2024 |
| WO | 2024/123565 A1 | 6/2024 |
| WO | 2024/253718 A1 | 12/2024 |

OTHER PUBLICATIONS

Ballard et al., "High-Power, Laser-Produced-Plasma EUV Source", Proc. SPIE, vol. 4688, 2002, pp. 302-309.

Chen et al., "High-temperature Operation of Periodic Index Separate Confinement Heterostructure Quantum Well Laser", Apll. Phys. Lett., vol. 59, No. 22, 1991, pp. 2784-2786.

Coffey, "Fiber Lasers Achieve World-Record Powers", 2003, pp. 13-14.

Coherent, "Conduction-Cooled Bar Packages (CCPs), 965-985 nm", 2015, pp. 1-4.

Cohn et al., "Magnetic-Field-Dependent Breakdown of CO2-Laser-Produced Plasma", Appl. Phys. Lett., vol. 20, No. 6, 1972, pp. 225-227.

Cooley et al., "Fundamentals of Discharge Initiation in Gas-Fed Pulsed Plasma Thrusters", The 29th International Electric Propulsion Conference, Princeton University, 2005, pp. 1-11.

Cooper, "Spectroscopic Identification of Water-Oxygen and Water-Hydroxyl Complexes and their Importance to Icy Duter Solar System Bodies", Chemistry School of Biomedical and Chemical Sciences, 2004, pp. 1-116.

Cremers et al., "Evaluation of the Continuous Optical No. 4, 1985, pp. 665-679. Discharge for Spectrochemical Analysis," Spectrochimica Acta, vol. 40B, No. 4, 1985, pp. 665-679.

Cross et al., "High Kinetic Energy (1-10eV) Laser Sustained Neutral Atom Beam Source", Nuclear Instruments and Methods in Physics Research B13, 198, pp. 658-662.

Cu-Nguyen et al., "Tunable Confocal Hyperspectral Imaging System", Optical MEMS and Nanophotonics, 2013, pp. 9-10.

Cu-Nguyen et al., "Tunable Hyperchromatic Lens System for Confocal Hyperspectral Sensing", Optics Express, vol. 21, No. 13, 2013, pp. 27611-27621.

Daily et al., "Two-Photon Photoionization of the Ca 4s3d(1)D(2) Level in an Optical Dipole Trap", Physical Review A, vol. 71, 2005, pp. 043406-1-343406-5.

Davis, "Lasers And Electra-Optics: Fundamentals And Engineering", 1996, pp. 1-35.

De Jong et al., "A Pulsed Arc-Glow Hollow Cathode Lamp", Spectroehimlea Acta, vol. 29B, 1974, pp. 179-190.

Demtroder, "Laser Spectroscopy: Basic Concepts And Instrumentation", Second Enlarged Edition, 1982, pp. 395-398.

Derra et al., "UHP Lamp Systems for Projection Applications", J. Phys. D: Appl. Phys. Vol. 38, 2005, pp. 2995-3010.

DET25K—GaP Detector, 150-550 nm, 1 ns Rise Time, 4.8 mm2, 8-32 Taps, Thorlabs, 2005, p. 1.

Digonnet, "Rare-Earth-Doped Fiber Lasers And Amplifiers", Optical Engineering, 2001, pp. 144-170.

Diwakar et al., "Role of Laser Pre-Pulse Wavelength and Inter-Pulse Delay on Signal Enhancement in Collinear Double-Pulse Laserlinduced Breakdown Spectroscopy", Spectrochimia Acta, Part B, 2013, pp. 65-73.

(56)          References Cited

OTHER PUBLICATIONS

Dorsch et al., "Performance and Lifetime of High-Power Diode Lasers and Diode Laser Systems", Proc. SPIE, vol. 3628, 1999, pp. 56-63.

Dorsch et al., 2 KW cw Fiber-coupled Diode Laser System, Proceedings of SPIE vol. 3889, 2000, pp. 45-53.

Durfee III et al., "Development of a Plasma Waveguide for High-Intensity Laser Pulses", Physical Review E, vol. 51, No. 3, 1995, pp. 2368-2389.

Dusterer et al., "Optimization of EUVRradiation Yield from Laser-Produced Plasma", Appl. Phys., B-73, 2001, pp. 693-698.

Eckstrom et al., "Microwave Interactions With Plasmas", IEEE Trans. Plasma Sci. vol. 18, 1992, pp. 1-9 with appendixes.

Edmund Optics, Lens UV-SCX 25MM DIA x 25MM FL Uncoated (Drawing), p. 1.

Eletskii et al., "Formation kinetics and parameters of a photoresonant plasma", Soy. Phys. JETP, vol. 67, No. 5, 1988, pp. 920-924.

Emmett et al., "Direct Measurement of Xenon Flashtube Opacity", Journal of Applied Physics, vol. 35, No. 9, 1964, pp. 2601-2604.

Endo et al., "Laser Produced EUV Light Source Development for HVM", Spie Advanced Lithography, 2007, pp. 1-25.

Erskine et al., "Measuring Opacity of Shock Generated Argon Plasmas" , J. Quart Spectro. Radial Transfer, vol. 51, No. 12, 1994, pp. 97-100.

F10T/F10T2 and F6 Lightshield Systems Parts Listing, Heraeus Noblelight America LLC, 2015, pp. 1-12.

F300S/F300SQ UV Lamp System Parts Listing, Heraeus Noblelight America LLC, 2015, pp. 1-26.

Feng et al., "A stigmatic Ultraviolet-Visible Monochromator for Use with a High Brightness Laser Driven Plasma Light Source", Review of Scientific Instruments, vol. 84, 2013, pp. 1-6.

Fiedorowicz et al., "X-Ray Emission form Laser-Irradiated Gas Puff Targets," Appl. Phys. Lett., vol. 62, No. 22, May 31, 1993, pp. 2778-2780.

Fomenkov et al., "Laser Produced Plasma Light Source for EUVL", Cymer Inc., 17075 Thommint Court, San Diego, CA 92127, USA, 2011, pp. 1-6.

Franzen, "Continuous Laser-Sustained Plasmas", 1973, J. Appl. Phys., vol. 44, pp. 1727-1732.

Franzen, "CW Gas Breakdown in Argon Using 10.6-μm Laser Radiation," Appl. Phys. Lett., vol. 21, No. 2, Jul. 15, 1972, pp. 62-64.

Frey et al., "Spectroscopy and kinetics of the ionic cesium flouride excimer excited by a Laser-Produced Plasma", Journal of the Optical Society of America B, vol. 6, No. 8, 1989, pp. 1529-1535.

Fujimoto et al., "High Power InGaAs/AlGaAs laser Diodes with Decoupled Confinement Heterostructure", SPIE vol. 3628, 1999, pp. 38-45.

Galvanauskas, "Fiber laser based EUV lithography sources", Panel discussion presentation at the SEMATECH EUV Source Workshop (2007).

Geisler et al., "Spectrometer System Using a Modular Echelle Spectrograph and a Laser-Driven Continuum Source for Simultaneous Multi-Element Determination by Graphite Furnace Absorption Spectrometry", Spectrochimica Acta Part B, vol. 107, 2015, pp. 11-16.

Generalov et al., "Experimental Investigation of a Continuous 1972, pp. 763-769. Optical Discharge," Soviet Physics JETP, vol. 34, No. 4, Apr. 1972, pp. 763-769.

Gentile et al., "Oxidative Decontamination of Tritiated Materials Employing Ozone Gas", PPPL, 2002, pp. 1-9.

Gentile et al., "Tritium Decontamination of TFTR D-T Graphite Tiles Employing Ultra Violet Light and a Nd:YAG Laser", Japan Atomic Energy Research Institute, 1999, p. 321-322.

George et al., "13.5 nm EUV Generation from Tin-doped Droplets Using a Fiber Laser", Optics Express, vol. 15, No. 25, 2007, pp. 16348-356.

Girard et al., "Generating Conditions of a Laser-Sustained Argon Plasma Jet",J. Phys. D: Appl. Phys., vol. 26, 1993, pp. 1382-1393.

Glangetas, "New Design for a Microwave Discharge Lamp", Rev. Sci. Instrum., vol. 51, No. 3, 1980, pp. 390-391.

Griem, "Plasma Spectroscopy", 1964, pp. 172-176.

Gullikson et al., "A Soft X-Ray/EUV Reflectometer Based on a Laser Produced Plasma Source", Journal: Journal of X-Ray Science and Technology, vol. 3, No. 4, 1992, pp. 283-299.

Gwyn, "EVU Lithography Update: The timeline puts the screws to extreme ultraviolet lithography, but engineers rise to the challenge", SPIE, 2002, pp. 1-4.

Hadal et al., "Influence of Ambient Gas on the Temperature and Density of Laser Produced Carbon Plasma", Appl. Phys. Lett. vol. 72, No. 2, 1998, pp. 167-169.

Mobarhan, "Test and Characterization of Laser Diodes: Determination of Principal Parameters", 1999, pp. 1-7.

Moody, "Maintenance of a Gas Breakdown in Argon Using 10.6-μ cw Radiation", Journal of Applied Physics, vol. 46, No. 6, Jun. 1975, pp. 2475-2482.

Mora, "Theoretical Model of Absorption of Laser Light by a Plasma", Phys. Fluids, vol. 25, No. 6, 1982, pp. 1051-1056.

Mordovanakis et al., "Demonstration of Fiber-laser-produced Plasma Source and Application to Efficient Extreme UV Light Generation", Optics Letter, vol. 31, No. 17, 2006, pp. 2517-2519.

Mosier-Boss et al., "Detection of Lead Derived from Automotive Scrap Residue Using a Direct Push Fiber-Optic Laser-Induced Breakdown Spectroscopy Metal Sensor", Applied Spectroscopy, vol. 59, No. 12, 2005, pp. 1445-1456.

Mosier-Boss et al., "Field Demonstrations of a Direct Push FO-LIBS Metal Sensor", Environ. Sci. Technol., vol. 36, 2002, pp. 3968-3976.

Motomura et al., "Temporal VUV Emission Characteristics Related to Generations and Losses of Metastable Atoms in Xenon Pulsed Barrier Discharge", J. Light & Vis. Env. vol.30, No. 2, 2006, pp. 81-86.

Moulton, "Tunable Solid-State Lasers", Proceedings of the IEEE, vol. 80, No. 3, 1992, pp. 348-364.

Muller et al., "Theoretical Model for a Continuous Optical Discharge", Physica, 112C, 1982, pp. 259-270.

Nagano et al., "Present Status of Laser-Produced Plasma EUV Light Source", Proc. Of SPIE, vol. 7636, 2010, pp. 76363C-1-76363C-9.

Nakar et al., "Radiometric Characterization of Ultrahigh Radiance Xenon Short-Arc Discharge Lamps, Ben-Gurion University", Applied Optice, vol. 47,No. 2, Jan. 9, 2008.

Neukum, "Vom Halbleiterchip zum Laserwerkzeug", 2007, pp. 18-20.

Nikitin et al., "Guiding of Intense Femtosecond Pulses in Preformed Plasma Channels", Optics Letter, vol. 22, No. 23, 1997, pp. 1787-1789.

Norimatsu et al., "Cryostat to Provide a Solid Deuterium Layer in a Plastic Shell for the Gekko XII Glass Laser System", Review Of Scientific Instruments, vol. 63, No. 6, 1992, pp. 3378-3383.

Zimakov, "Continuous Optical Discharges Sustained by Near-IR Laser Radiation", 42th international conference on plasma physics and CF, 2015, p. 1.

OEM Compact Fiber Laser module 1090nm 10-20W CW/M With GTWave Technology, SPI Lasers LLC.

Oettinger et al., Plasma Ionization Enhancement by Laser Line Radiation, AIAA Journal, vol. 8, No. 5, 1970, pp. 880-885.

Zhang et al., "Designing a High Performance TEC Controller", Proceedings of SPIE vol. 4913, 2002, pp. 177-183.

Zajac et al., "10 W cw Nd-Doped Double-clad Fiber Laser Operating at 1.06 μm", Proceedings of SPIE vol. 5036, 2003, pp. 135-138.

Yusim et al., "100 Watt, single-mode, CW, Linearly Polarized All-fiber Format 1.56 μm Laser with Suppression of Parasitic Lasing Effects", Proceedings of SPIE, vol. 5709, 2005, pp. 69-77.

Yoshizawa et al., "Disk-shaped Vacuum Ultraviolet Light Source Driven by Microwave Discharge for Photoexcited Processes", Appl. Physc. Lett., vol. 559, 1991, pp. 1678-1680.

Yoshino et al., "Absorption Spectrum of Xenon in the Vacuum-Ultraviolet Region",J. Opt. Soc. Am. B/vol. 2, No. 8, 1985, pp. 1268-1274.

(56) References Cited

OTHER PUBLICATIONS

Orth et al., "High-Resolution Spectra of Laser Plasma Light Sources in the Normal Incidence XUV Region", Applied Optics, vol. 25, No. 13, 1986, pp. 2215-2217.

OSRAM Opto Semiconductors Announces New Solutions for Laser Applications; New Offerings Provide High Output and Enhanced Reliability, Business Wire, Jun. 28, 2005, pp. 1-3.

Oxford Dictionary of Astronomy, definition of bound-bound transition, 2003, p. 59.

Pankert et al., "EUV Sources for the Alpha-Tools", Proc. Of SPIE, vol. 6151, 2006, pp. 1-9.

Pappas et al., "Formation of a Cesium Plasma by Continuous-Wave Resonance Excitation", Applied Spectroscopy, vol. 54, No. 8, 2000, pp. 1245-1249.

Parker, "McGraw-Hill Dictionary of Scientific and Technical Terms",5th Edition, 1994, p. 561.

Patel et al., "The Suitability of Sapphire for Laser Windows", Meas. Sci. Technol., vol. 10, 1999, pp. 146-151.

Pebler et al., "Stabilizing the Radiant Flux of a Xenon Arc Lamp", Applied Optice, vol. 20, No. 23, 1981, pp. 4059-4061.

Perry, "Solar Thermal Propulsion: An Investigation Of Solar Radiation Absorption In A Working Fluid", 1984 pp. 1-70.

Petring et al., "High Power Diode Lasers", Technology and Applications, 2007, pp. 285-533.

Phillip, "Optical Properties of Non-Crystalline Si, SiO, SiOx and SiO2", J. Phys. Chem. Solids, vol. 32, 1971, pp. 1935-1945.

Phillip, "Optical Transitions in Crystalline and Fused Quartz", Solid State Communications vol. 4, 1966, pp. 73-75.

Phillips et al.,"Characterization and Stabilization of Fiber-Coupled Laser Diode Arrays", Review Of Scientific Instruments, vol. 70, No. 7, 1999, pp. 2905-2909.

Plyler et al., "Precise Measurement of Wavelengths in Infrared Spectra", Journal of Research of the National Bureau of Standards, vol. 55, No. 5, 1955, pp. 279-284.

Polijanczuk et al., "Semiconductor Lasers for Microsoldering", 1991, pp. 6/1-6/4.

Prabhu et al., "High-Power CW Raman Fiber Laser Using Phosphosilicate Fiber Pumped by Yb-doped Double-clad Fiber Laser", IEE Colloquium on Advances in Interconnection Technology, 2001, pp. 482-485.

Raizer, "Continuous Optical Discharge: Generation and Support of Dense Low-Temperature Plasma by Laser Irradiation", 1996, pp. 87-94.

Raizer, "Gas Discharge Physics", 1991, pp. 1-449.

Raizer, "Optical Discharges," Sov. Phys. Usp., vol. 23, No. 11, 1980, pp. 789-806.

Rhemet, "Xenon Lamps", IEE Proc., vol. 127, Pt. A, No. 3, 1980, pp. 190-195.

Richardson et al., "High Conversion Efficiency Mass-Limited Sn-Based Laser Plasma Source for Extreme Ultraviolet Lithography", J. Vac. Sci. Technol. B., vol. 22, No. 2, 2004, pp. 785-790.

Rietdorf et al., "Special Optical Elements", J. (eds) Handbook Of Biological Confocal Microscopy, 2006, pp. 43-58.

Rockstroh et al., "Spectroscopic Studies of Plasma During CW Laser Materials Interaction", J. Appl. Phys., vol. 61, No. 3, 1987, pp. 917-922.

Roth et al., "Directly Diode-laser-pumped Ti:sapphire laser", Optics Letters, vol. 34, No. 21, 2009, pp. 3334-3336.

Sacchi, "Laser-Induced Electric Breakdown in Water", J. Opt. Soc. Am. B, vol. 28, No. 2, 1991, pp. 337-345.

Sakamoto et al., "120W CW Output Power from Monolithic AlGaAs (800nm) Laser Diode Array Mounted on Diamond Fleatsink", Electronic Letter, vol. 28, No. 2, 1992, pp. 197-199.

Saloman, "Energy Levels and Observed Spectral Lines of Xenon, Xe(I) through Xe(LIV)", J. Phys. Chem. Ref. Data, vol. 33, No. 3, 2004, pp. 765-921.

Saraswat et al., "Single Wafer Rapid Thermal Multiprocessing", Mat. Res. Soc. Symp. Proc. vol. 146, 1989, pp. 3-13.

Tombelaine et al., "Spectrally shaped light from supercontinuum fiber light sources", Optics Communications, Apr. 1, 2011, vol. 284, Issue 7, pp. 1970-1974.

International Search Report and Written Opinion received for PCT Application Serial No. PCT/US2022/012676 dated May 6, 2022, 09 pages.

Schohl et al., "Absolute Detection of Metastable Rare Gas Atoms by a CW Laser Photoionization Method", Z. Phys. D—Atoms, Molecules and Clusters, vol. 21, 1991, pp. 25-39.

Yamanaka, "Inertial Confinement Fusion Research at ILE Osaka", Nuclear Fusion, vol. 25, No. 9, 1985, pp. 1343-1349.

Shaw et al., "Preliminary Design of Laser-Induced Breakdown Spectroscopy for Proto-Material Plasma Exposure Experiment", Review Of Scientific Instruments, vol. 85, 2014, pp. 11D806-1-11D806-3.

Shen et al., "Highly Efficient Er, Yb-Doped Fiber Laser with 188W Free-Running and >100W Tunable Output Power", Optics Express, vol. 13, No. 13, 2005, pp. 4916-4921.

Shigeyoshi et al., "Near Infrared Absorptions of Neon, Argon, Krypton, and Xenon Excited Diatomic Molecules", J. Chem. Phys., vol. 68, 1978, pp. 7595-4603.

Shimada et al., "Characterization of Extreme Ultraviolet Emission from Laser-Produced Spherical Tin Plasm Generated with Multiple Laser Beams", Applied Physics Letters, vol. 86, 2005, pp. 051501-1-051501-3.

Shirakawa et al., "CW 7-W, 900-nm-wide Supercontinuum Source by Phosphosilicate Fiber Raman Laser and Highnonlinear Fiber", Proceedings of SPIE, vol. 5709, 2005, pp. 199-205.

Sidawi, "Fiber Lasers Gain Power", www.rdmag.com, 2003, p. 26.

Silfvast et al., "Comparison of Radiation from Laser-Produced and DC-Heated Plasmas in Xenon", Applied Physics Letters, vol. 25, No. 5, 1974, pp. 274-277.

Silfvast, Laser Fundamentals, Schhol of Optics, 2004, pp. 1-6, pp. 199-222 & 565-68.

Skenderovic et al., "Laser-ignited glow discharge in lithium vapor", Physical Review A, vol. 62, 2000, pp. 052707-1-052707-7.

Smith, "Gas-Breakdown Dependence on Beam Size and Pulse Duration with 10.6-μ Wavelength Radiation", Applied Physics Letters, vol. 19, No. 10, 1971, pp. 405-408.

Snyder et al., "Laser-Induced Breakdown Spectroscopy of High-Pressure Bulk Aqueous Solutions", Applied Spectroscopy, vol. 60, No. 7, 2006, pp. 786-790.

Sobota et al., "The Role of Metastables in the Formation of an Argon Discharge in a Two-Pin Geometry", IEEE Transactions on Plasma Science, vol. 38, No. 9, 2010, pp. 2289-2299.

Song et al., "Mechanisms of Absorption in Pulsed Excimer Laser-Induced Plasma", Appl. Phys. A, vol. 65, 1997, pp. 477-485.

Stamm, "Extreme Ultraviolet Light Sources for use in Semiconductor Lithography—State of the Art and Future Development", J. Phys. D: Appl. Phys., vol. 37, 2004, pp. 3244-3253.

Stulen et al., "Developing A Soft X-Ray Projection Lithography Tool", AT & T Technical Journal, 1991, pp. 37-48.

Su et al., "Note: A Transient Absorption Spectrometer Using an Ultra Bright Laser-Driven Light Source", Review Of Scientific Instruments, vol. 84, 2013, pp. 086106-1-386106-3.

Sundvold et al., "Optical Firing System", Proc. Of SPIE, vol. 5871, 2005, pp. 587104-1-587104-10.

Super-Quiet Xenon Lamp Super-Quiet Mercury-Xenon Lamp, Hamamatsu Product Information, Nov. 2005, 16 pages.

Surzhikov, "Numerical Simulation of Subsonic Gasdynamical Instabilities Near Heat Release Regions", AIAA, 1996, pp. 1-11.

Yamakoshi et al., "Extreme-Ultraviolet Laser Photo-Pumped by a Self-Healing Hg Target",SPIE, Vo.. 2015, 1994, pp. 227-231.

Szymanski et al., "Nonstationary Laser-Sustained Plasma", Journal of Applied Physics, vol. 69, No. 6, 1990, pp. 3480-3484.

Szymanski et al., "Spectroscopic Study of a Supersonic Jet of Laser-Heated Argon Plasma", J. Phys. D: Appl. Phys., vol. 30, 1997, pp. 998-1006.

Takahashi et al., "Numerical Analysis of Ar(2) Excimer Production in Laser-Produced Plasmas", Journal of Applied Physics, 1998, pp. 390-393.

(56)                  References Cited

OTHER PUBLICATIONS

Takahashi et al., "Ar(2) Excimer Emission from a Laser-Heated Plasma in a High-Pressure Argon Gas", Applied Physics Letters, vol. 77, No. 5, 2000, pp. 4115-4117.

Tam et al., "Plasma Production In a Cs Vapor by a Weak cw Laser Beam at 6010 A, Optics Communications", vol. 21, No. 3, 1977, pp. 403-407.

Tam, "Dynamic Response of a cw Laser-produced Cs Plasma to Laser Modulations", Appl. Phys. Lett., vol. 35, No. 9, 1979, pp. 683-685.

Tam, "Quasiresonant Laser-Produced Plasma: An Efficient Mechanism for Localized Breakdown", J. Appl. Phys., vol. 51, No. 9, 1980, pp. 4682-4687.

Tanaka et al., "Production of Laser-Heated Plasma in High-Pressure Ar Gas and Emission Characteristics of Vacuum Ultraviolet Radiation from Ar(2) Excimers", Appl. Phys. B, vol. 74, 2002, pp. 323-326.

Tansu, "Novel Quantum-Wells GaAs-Based Lasers for All Transmission Windows in Optical Communication", 2003, pp. i-291.

Theriault et al., "A Real-Time Fiber-Optic LIBS Probe for the In Situ Delineation of Metals in Soils", Field Analytical Chemistry and Technology, vol. 2, No. 2, 1998, pp. 117-125.

Theriault et al., "Field Deployment of a LIBS Probe for Rapid Delineation of Metals in Soils", SPIE, vol. 2835, 1996, pp. 83-88.

Thermoelectric Cooler Controller, Analog Devices Inc., 2002, pp. 1-24.

Tichenor et al., "Soft-x-ray projection lithography experiments using Schwarzschild imaging optics", Applied Optics, vol. 32, No. 34, 1993, pp. 7068-7071.

Yamada et al., "Ionization Mechanism of Cesium Plasma Produced by Irradiation of Dye Laser", Jpn. J. Appl. Phys. vol. 31, 1992, pp. 377-380.

Tooman, "The Sandia Laser Plasma Extreme Ultraviolet and Soft X-ray (XUV) Light Source", SPIE vol. 664, 1986, pp. 186-191.

Topanga Advanced Plasma Lighting APL1000-4000SF, p. 1.

Topanga Advanced Plasma Lighting Apl 1000-5000SF, p. 1.

Topanga Advanced Plasma Lighting APL250-4000BF, p. 1.

Topanga Advanced Plasma Lighting APL250-4000SF, p. 1.

Topanga Advanced Plasma Lighting APL250-5500SF, p. 1.

Topanga Advanced Plasma Lighting APL400-4000BF, p. 1.

Topanga Advanced Plasma Lighting APL400-4000SF, p. 1.

Topanga Advanced Plasma Lighting APL400-5500BF, p. 1.

Topanga Advanced Plasma Lighting APL400-5500SF, p. 1.

Topanga's Advanced Plasma Lighting System, Topanga USA, 2016, pp. 1-5.

Treshchalov et al., "Spectroscopic Diagnostics of Pulsed Discharge in High-Pressure Argon", Quantum Electrics, vol. 40, No. 3, 2010, pp. 234-240.

Tsuboi et al., "Nanosecond Imaging Study on Laser Ablation of Liquid Benzene", Appl. Phys. Lett, vol. 64, 1994, pp. 2745-2747.

Uhlenbusch, et al., "Hβ-Line Profile Measurements in Optical Discharges", J. Quant. Spectrosc. Radiat. Transfer vol. 44, No. 1, 1990, pp. 47-56.

Abe et al., "KrF Laser Driven Xenon Plasma Light Source of a Small Field Exposure Tool", Proc. Of SPIE, vol. 6151, 2006, pp. 61513T-1-61513T-5.

Agrawal et al., "Infrared And Visible Semiconductor Lasers", 1993, pp. xiii-616.

Agrawal et al., "Semiconductor Lasers", Second edition, 1993, p. 547.

Ahmed et al., "Laser Optogalvanic Spectroscopic Studies of Xenon", J. Phys. B: At. Mol. Opt. Phys. 31, 1998, pp. 4017-4028.

Aitoumeziane et al., "Theoretical and Numerical Study of the Interaction of a Nanosecond Laser Pulse with a Copper Target for Laser-Induced Breakdown Spectroscopy Applications". J. Opt. Soc. Am. B, vol. 31, No. 1, 2014, pp. 53-61.

Al-Muhanna et al., High-Power (>10 W) Continuous-Wave Operation from 100-μm-Aperture 0.97-μm-emitting Al-Free Diode Lasers, Applied Physics Letters, vol. 73, No. 9, Aug. 31, 1998, pp. 1182-1184.

Angel, "LIBS Using Dual-Laser Pulses", 2002, p. 14.

Apter, "High-power Diode Lasers Offer Efficient Answer, Product Guide", 2005, pp. 1-3,.

Aragon et al., "Determination of Carbon Content in Molten Steel Using Laser-Induced Breakdown Spectroscopy", 1993, pp. 306-608.

Arieli, Excitation of Gas Laser by Optical Pumping, Chapter 6.1, Gas Laser, 2006, p. 2b.

Arp et al., "Argon Mini-Arc Meets its Match: Use of a Laser-Driven Plasma Source in Ultraviolet-Detector Calibrations", Applied Optics vol. 53, Issue 6 , 2014, pp. 1089-1093.

Arp et al., "Feasibility of Generating a Useful Laser-Induced Breakdown Spectroscopy Plasma on Rocks at High Pressure: reliminary Study for a Venus Mission", Spectrochimica Acta Part B 59, 2004, pp. 987-999.

Arzuov et al., Self-Maintenance of a Continuous Optical Discharge in Gases Near Solid Targets, Soy. J. Quant. Electron., vol. 5, No. 5, 1975, pp. 523-525.

Azuma et al., Debris from Tape-Target Irradiated with Pulsed YAG Laser, Applied Surface Science, 2002, pp. 224-228.

B 11 3mmaxoe, 011THLIECKHE PA3PFIRb1,110flREPK4BAEMDIE l4311YLIEHMEM J1A3EPOS Efill)KHEI-0 ilk-l4-EIA11A3OHA Ommixo-xmknyeckasi Kmue-rma B ra3ouoii gmuamme, www. chemphys.edu.ru/pdf/2014-11-29-001.pdf.

B.B. Kostin, 14311YLIEH14EF1J1A3Mbl, HAIPETOC4 KOPOTKI4MI4 11A3EPHb1MI4 14M11YIIbCAM14 23(2) 014314KA EfflA3Mbl 118 (1997).

B.T. Apxpinkmu and A. K. Dona HEIII4HEOHAFI 011T14KA l4 11PEOBPA3OBAHHE CBETA B IA3AX 153(3) YalEXl4 IM3l44ECK14X HAYK 423 (1987).

Babucke et al., "On the Energy Balance in the Core of Electrode-Stabilized High-Pressure Mercury Discharges", J. Phys. D: Appl. Phys. vol. 24, 1991, pp. 1316-1321.

Bachmann, "Goals and status of the German national research initiative BRIOLAS (brilliant diode lasers)" Proc. of SPIE vol. 6456, 2007, 645608-1.

Bachmann, "Industrial Applications of High Power Diode Lasers in Materials Processing", Applied Surface Science, 208-209, 2003, pp. 125-136.

Baer, "Plasma Diagnostics With Semiconductor Lasers Using Fluorescence And Absorption Spectroscopy", Stanford University ProQuest Dissertations Publishing, 1993, pp. 1-194.

Ball, "Raman Spectroscopy", vol. 17, No. 2, 2002, pp. 50-52.

Ballman et al., "Synthetic Quartz with High Ultraviolet Transmission", Applied Optics, vol. 7, No. 7, 1968, pp. 1387-1390.

Barnes et al., "Argon Arc Lamps", Applied Optics, vol. 24, No. 13, 1985, pp. 1947-1949.

Barnes et al., "High Power Diode Laser Cladding", Journal of Materials Processing Technology, vol. 138, 2003, pp. 411-416.

Bartz et al., "Optical Reflectivity Measurements Using a Laser Plasma Light Source", Appl. Phys. Lett. vol. 55, No. 19, 1989, pp. 1955-1957.

Bataller et al., "Nanosecond High-Power Dense Microplasma Switch for Visible Light",Applied Physics Letters, vol. 105, 2014, pp. 1-5.

Bauder, Radiation from High-Pressure Plasmas, Journal of Applied Physics, vol. 39, No. 1, 1968, pp. 148-152.

Beam Samplers; UV Fused Silica Beam Samplers, (AR Coating: 250-420 nm) (AR Coating: 350-700 nm) (AR Coating: 550-1050 nm) (AR Coating: 1050-1700 nm), 3 pages.

Beck, "Simple Pulse Generator for Pulsing Xenon Arcs with High Repetition Rate," Rev. Sci. Instrum., vol. 45, No. 2, Feb. 1974, pp. 318-319.

Belasri et al., "Electrical Approach of Homogenous High Pressure NelXe/CHI Dielectric Barrier Discharge for XeCl (308 nm) Lamp", Plasma Chem Plasma Process, vol. 31, 2011, pp. 787-798.

Bloch et al., "Field Test of a Novel Microlaser-Based Probe for in Situ Fluorescence Sensing of Soil Contamination", Applied Spectroscopy, vol. 52, No. 10, 1998, pp. 1299-1304.

Bogaerts et al., "Gas Discharge Plasmas and their Applications", Spectrochimica Acta Part B 57, 2001, pp. 609-658.

Bolshov et al., "Investigation of the Dynamic of an Expanding Laser Plume by a Shadowgraphic Technique", Spectrochimica Acta Part B 63, 2008, pp. 324-331.

(56)          References Cited

OTHER PUBLICATIONS

Borghese et al., "Time-Resolved Spectral and Spatial Description of Laser-Induced Breakdown in Air as a Pulsed, Bright, and Broadband Ultraviolet-Visible Light Source", Applied Optics, vol. 37, No. 18, Jun. 20, 1998, pp. 3977-3983.

Brauch et al., "High-Power Diode Lasers for Direct Applications", Topics Appl. Phys., vol. 78, 1000, pp. 303-368.

Breton et al., "Vacuum-UV Radiation of Laser-Produced Plasmas", Journal of the Optical Society Of America, vol. 63, No. 10, 1973, pp. 1225-1232.

Bridges et al., "Investigation of a Laser-Produced Plasma VUV Light Source", Applied Optics, vol. 25, No. 13, Jul. 1, 1986, pp. 2208-2214.

Bridges, "Characteristics of an Opto-Galvanic Effect in Cesium and Other Gas Discharge Plasmas", J. Opt. Soc. Am., vol. 68, No. 3, Mar. 1978, pp. 352-360.

Bussiahn, R., et al., "Experimental and theoretical investigations of a low-pressure He-Xe discharge for lighting purpose," Journal of Applied Physics, vol. 95, No. 9, May 1, 2004, pp. 4627-4634.

Byer, "Laser-Produced Plasmas: A Compact Soft X-Ray Source with High Peak Brightness", Defence Technical Information Centre, 1989, pp. 1-26.

C10T/C6 Lightshield System Parts Listing, Heraeus Noblelight America LLC, 2015, pp. 1-8.

Cann, "Light Sources in the 0.15-20-µ Spectral Range", Applied Optics, vol. 8, No. 8, 1969, pp. 1645-1661.

Carlhoff et al., "Continuous Optical Discharges al Very High Pressure," Physica 103C, 1981, pp. 439-447.

Carlhoff et al., "High Pressure Optical Discharges", Journal of Physics, 1979, pp. 757-758.

Cedolin et al., "Laser-Induced Fluorescence Measurements of Resonance Broadening in Xenon", Physical Review A, vol. 54, No. 1, 2006, pp. 335-342.

Cedolin, "Laser-Induced Fluorescence Diagnostics Of Xenon Plasmas", 1997, pp. 1-96.

Cermax lamps,including models LX300F, LX1000CF, EX300-10F; EX500-13F, EX900C-10F, EX900G-13F,EX1000C-13F, LX125F, LX175F, LX500CF, EX125-10F, EX175-10F, EX500-10F,EX1000C-10F, EX900-10F;Perkin Elmer Optoelectronics.

Cesar et al., "High-power fibre lasers", Nature Photonics, vol. 7, 2013, pp. 861-867.

Chang et al., "Fiber Laser Driven EUV Generation", Conference on Lasers and Electro-Optics, 2005, pp. 2200-2202.

Notice of Reasons for Rejection received for corresponding Japanese Patent Application No. 2023-528085 mailed on May 7, 2024, 8 pages including 4 pages of English Translation.

Hanselman, "Laser-Light Thomson and Rayleigh Scattering in Atmospheric-Pressure Laboratory Plasmas", 1993, Department of Chemistry, pp. ii-385.

Hansson et al., "Liquid-Xenon-Jet Laser-Plasma Source for EUV Lithography", SPIE, vol. 4506, 2001, pp. 1-8.

Hansson, "Laser-Plasma Sources For Extreme-Ultraviolet Chaps. 5 & 6", 2003, pp. 1-58.

Harris, "A Century of Sapphire Crystal Growth Proceedings", Proceedings of the 10th DoD Electromagnetic Windows Symposium Norfolk, 2004, pp. 1-56.

Harris, "Review Of Navy Program To Develop Optical Quality Diamond Windows And Domes", Naval Air Systems Command, 2002, pp. 1-16.

Harrison et al., "Low-threshold, cw, All-solid-state Ti:Al203 Laser", Optics Letter, vol. 16, No. 8, 1991, pp. 581-583.

Hawke et al., "An Apparatus for High Pressure Raman Spectroscopy", Rev. Sci. Instrum., vol. 45, No. 12, 1974, pp. 1598-1601.

Haysom, "Quantum Well Intermixing of InGaAs(P)/InP Heterostructures", Department of Physics, 2001, pp. ii-224.

Hebner et al., "Measured Pressure Broadening and Shift Rates of the 1.73 µm (5d[3/21]1-6p[5/2]2) Transition of Xenon", Applied Physics Letters, vol. 59, No. 9, 1991, pp. 537-539.

Hecht, "Fiber Lasers: Fiber Lasers: The state of the art", Laser Focus World, 2012, pp. 1-11.

Hecht, "Refraction", Optics (Third Edition), Chapter 4, 1998, pp. 100-101.

High Power Diode Laser, Rofin-Sinar Technologies, Inc., 2000, pp. 1-26.

Horn et al., "Evaluation and Design of a Solid-State 193 nm OPO-Nd:YAG Laser Ablation System", Spectroch mica Acta Part B, vol. 58, 2003, pp. 1837-1846.

Hou et al., "Fiber Laser For EUV Generation", EUV Source Workshop, 2006.

Hou et al., "High Intensity Fiber Lasers: Emerging New Applications and New Fiber Technologies", IEEE LEOS Newsletter, 2007, pp. 22-25.

Hou et al., "High Power Fiber Laser Driver for Efficient EUV Lithography Source with Tin-Doped Water Droplet Targets", Optics Expres,, vol. 16, No. 2, 2008, pp. 965-974.

Hu et al., "Laser Induced Stabilisation of the Welding Arc", 2005, Science and Technology of Welding and Joining, vol. 10, No. 1, pp. 76-81.

Huffman et al., "Absorption Coefficients of Xenon and Argon in the 600-1025 Angstrom Wavelength Regions", The Journal of Chemical Physocs, vol. 39, 1963, pp. 902-909.

Hughes, "Plasmas And Laser Light", University of Essex, 1975, pp. 200-272.

I.M. Beterov et al. "Resonance radiation plasma (photoresonance plasma)", Soy. Phys. Usp. vol. 31, No. 66, 1988, pp. 535-554.

Instruction Manual: LDC-3722 Laser Diode Controller, ILX Lightwave Corporation, 1990, pp. 1-1-4-33.

Generalov et al., "Continuous Optical Discharge," ZhETF Pis. Red. 11, No. 9, May 5, 1970, pp. 302-304.

Jin et al., New Laser Plasma Source for Extreme-Ultraviolet, 1995, pp. 2256-2258.

Jahier et al., "Implementation of a Sapphire Cell with External Electrodes for Laser Excitation of a Forbidden Atomic Transition in a Pulsed E-Field", Eur. Phys. J.D., vol. 13, 2001, pp. 221-229.

Jansson et al., "Liquid-Tin-Jet Laser-Plasma Extreme Ultraviolet Generation", Applied Physics Letters, vol. 84, No. 13, 2004, pp. 2256-2258.

Jaroszynski et al., "Radiation Sources Based on Laser—Plasma Interactions", Phil. Trans. R. Soc. vol. 364,2006, pp. 689-710.

Jauregui et al., "High-power Fibre Lasers", Nature Photonics, vol. 7, 2013, pp. 861-867.

Jeng et al., "Theoretical Investigation of Laser-Sustained Argon Plasmas," J. Appl. Phys., vol. 60, No. 7, Oct. 1, 1986, pp. 2272-2279.

Jinno et al., "Luminance and efficacy improvement of low-pressure xenon pulsed fluorescent lamps by using an auxiliary external electrode", J. Phys. D: Appl. Phys., vol. 40, 2007, pp. 3889-3895.

Jinno et al., "The Afterglow Characteristics of Xenon Pulsed Plasma for Mercury-Free Fluorescent Lamps", Czech. J. Phys., vol. 50, 2000, pp. 433-436.

Johnson, "Ultraviolet Emission Spectra of High-Pressure Rare Gases", 1970, Journal Of The Optical Society Of America,, vol. 60, No. 12, pp. 1669-1674.

Joshi et al., "Laser-Induced Breakdown Spectroscopy for In-Cylinder Equivalence Ratio Measurements in Laser-Ignited Natural Gas Engines", Applied Spectroscopy, vol. 63, No. 5, 2009, pp. 549-554.

Kaku et al., "Vacuum Ultraviolet Spectroscopic System Using a Laser-Produced Plasma", Journal of Applied Physics, vol. 42, 2003, pp. 3458-3462.

Kaku et al., "Vacuum Ultraviolet Transmission Spectroscopic System using a Laser-Produced Plasma", The Japan Society of Applied Physics, vol. 42, No. 6R, pp. 149-152.

Keefer et al., "Experimental Study of a Stationary Laser-Sustained Air Plasma," Journal of Applied Physics, vol. 46, No. 3, Mar. 1975, pp. 1080-1083.

Keefer et al., "Power Absorption Laser Sustained Argon Plasmas", AIAA Journal, vol. 24, No. 10, 1986, pp. 1663-1669.

Keefer, "Laser-Sustained Plasmas", 1989, pp. 169-206.

Kennedy et al., "A Review of the Use of High Power Diode Lasers in Surface Hardening, Journal of Materials Processing Technology", vol. 155-156, 2004, pp. 1855-1860.

(56) References Cited

OTHER PUBLICATIONS

Keyser et al. "Studies of High-Repetition-Rate Laser Plasma EUV Sources from Droplet Targets", Applied Physics A, vol. 77, 2003, pp. 217-221.

Kim et al., "Development of an In Situ Raman Spectroscopic System for Surface Oxide Films on Metals and Alloys in High Temperature Water, Nuclear Engineering and Design", vol. 235, 2005, pp. 1029-1040.

Kindel et al., Measurement of Excited States Density and the VUV-Radiation in the Pulsed Xenon Medium Pressure Discharge, Contrib. Plasma Phys., vol. 36, 1996, pp. 711-721.

Kirk et al., "Methods and Systems for Providing Illumination of a Specimen for Inspection" U.S. Appl. No. 60/806,204, filed Jun. 29, 2006, 48 pages.

Kirk et al., "Methods and Systems for Providing Illumination of a Specimen for Inspection", U.S. Appl. No. 60/759,846, filed Jan. 17, 2006, 18 pages.

Kirk et al., "Methods and Systems for Providing Illumination of a Specimen for Inspection", U.S. Appl. No. 60/772,425, filed Feb. 9, 2006, 20 pages.

Klein, "Measurements of Spectral Emission and Absorption of a High Pressure Xenon Arc in the Stationary and the Flashed Modes", 1968, pp. 677-685.

Klocke et al., "Investigation into the Use of High Power Diode Lasers for Hardening and Thermal Conduction Welding of Metals", SPIE, vol. 3097, 1997, pp. 592-598.

Knyazev, "Photoresonance Plasma Production by Excimer Lasers as a Technique for Anode-plasma Formation", Nucl. Instr. and Meth. in Phys. Res. A, vol. 415, 1998, pp. 525-532.

Kolb et al., "Low Optical Loss Synthetic Quartz", Mat. Res. Bull. vol. 7, 1972, pp. 397-406.

Kondow et al., "Temperature Dependence of Lasing Wavelength in a GaInNAs Laser Diode", IEEE Photonics Technology Letters, vol. 12, No. 7, 2000, pp. 777-779.

Kopecek et al., "Laser Ignition of Methane-Air Mixtures at High Pressures and Diagnostics", Journal of Engineering for Gas Turbines and Power, vol. 127, 2005, pp. 213-219.

User Manual: Cyberlight, Cyberlight Cx, Cyberlight Sv (Version 2.0), High End Systems, Inc., (1996).

Ushio Super-High Pressure Mercury Lamps, including USH-102D, USH-102DH, USH-205DP, USH-2055, USH-206D/M4, USH-250D, USH-250BY, USH-350DS, USH-351DS, USH-350DP, USH-450G5, USH-450GL, USH-500BY,USH-500MB, USH-502MB, USH-500T, USH-505MC, USH-5085, USH-508SA, USH-5095, USH-1000DW,USH-1000MC, USH-1000KS, USH-1002DW, Ushio.

Vadla et al., "Resonantly Laser Induced Plasmas in Gases: The Role of Energy Pooling and Exothermic Collisions in Plasma Breakdown and Heating", Spectrochimica Acta Part B, vol. 65, 2010, pp. 33-45.

Vampola, "P78-2 Engineering Overview", Defence Technical Information Centre, 1981, pp. 1-36.

Vukanovic et al., "A New Type of D.C. Arc as Spectrochemical Light Source", Spectrochimica Acta, vol. 29B, 1974, pp. 33-36.

Wang, "Self-Assembled Indium Arsenide Quantum-Dash Lasers of Indium Phosphide Substrates", Electrical and Computer Engineering, 2002, pp. vi-150.

Waynant et al., "Electro-Optics Handbook", Eds., 20002, pp. 1-1000.

Webb et al., "Handbook Of Laser Technology and Applications", Applications, vol. III, 2004, pp. 1587-1611.

Wei, "Transparent Ceramic Lamp Envelope Materials", J. Phys. D: Appl. Phys., vol. 38, 2005, pp. 3057-3065.

Weinrotter et al., "Application of Laser Ignition to Hydrogen-Air Mixtures at High Pressures", International Journal of Hydrogen Energy, vol. 30, 2005, pp. 319-326.

Weinrotter et al., "Laser Ignition of Engines", Laser Physics, vol. 15, No. 7,2005, pp. 947-953.

Wiehle et al., "Dynamics of Strong-Field Above-Threshold Ionization of Argon: Comparison Between Experiment and Theory", Physical Review A, vol. 67, 2003, pp. 063405-1-063405-7.

Wieman et al., "Using Diode Lasers for Atomic Physics", Rev. Sci. Instrum., vol. 62, No. 1, 1991, pp. 1-20.

Wilbers et al., "The Continuum Emission of an Arc Plasma," J. Quant. Spectrosc. Radiat. Transfer, vol. 45, No. 1, 1991, pp. 1-10.

Wilbers et al., "The VUV Emissivity of a High-Pressure Cascade Argon Arc from 125 to 200 nm," J. Quant. Spectrosc. Radiat. Transfer, vol. 46, 1991, pp. 299-308.

Winter et al., "Experimental and Theoretical Investigations of a Helium-Xenon Discharge in Spot Mode", 28th ICGQP, 2007 pp. 1979-1982.

Wood, "Atomic Processes: Bound-bound transitions (Einstein coefficients)", available at http://www-star.st-and.ac.uk-kw25/teaching/nebulae/lecture06_einstein.pdf, 2014, pp. 1-10.

World Record Powers Achieved in Single-Mode Fiber Lasers—Powers Scalable to IkW and Beyond, Southampton Photonics, Inc., 2003, pp. 1-2.

Wroblewski et al., "An Experimental Investigation of the Continuous Optical Discharge", Journal of Physique, 1979, pp. 733-734.

Wu et al., "Extreme Ultraviolet Lithography: Towards the Next Generation of Integrated Circuits", vol. 7, 2009, pp. 1-4.

Xenakis et al., "Laser-plasma X-ray Generation Using an Injection-mode-locked XeCl Excimer Laser", J. Appl. Phys., vol. 71, No. 1, 1992, pp. 85-93.

Xu et al., "Wavelength- and Time-Resolved Investigation of Laser-Induced Plasmas as a Continuum Source", Applied Spectroscopy, vol. 47, No. 8, 1993, pp. 1134-1139.

International Preliminary Report on Patentability received for corresponding PCT Application No. PCT/US2022/012676 mailed on Aug. 3, 2023, 6 pages.

Sereda et al., "High-power IR Lasers Operating on Xe I Transitions", Quantum Electron, vol. 23, No. 6, 1993, pp. 459-480.

Swiderski et al., "Q-switched Nd-doped double-clad fiber laser", Opto Electronics Review, vol. 13, No. 3, 2005, pp. 187-192.

Balasubramanian, Naveen Balaji, "Spectrophotometric Quantification of Bilirubin in Sclera of the Eye Using Visible DLP® Hyperspectral Imaging", URL: https://rc.library.uta.edu/uta-ir/handle/10106/11023, Master's Thesis, May 2012, 46 pages.

Mangum, Michael Lee, "A Multimodality DLP® Imaging System for Clinical Surgery", URL: https://rc.library.uta.edu/uta-ir/bitstream/handle/10106/24729/Mangum_uta_2502M_11524.pdf?sequence=1, Master's Thesis, Dec. 2011, 86 pages.

Hajian et al., "Powerful DMD-based light sources with a high throughput virtual slit", Proceedings of SPIE, vol. 9761, Article 97610E, Mar. 2016, pp. 1-4.

"OL 490 Agile Light Source Now Available in NIR Wavelength range", URL: https://optroniclabs.com/wp-content/uploads/2013/04/490-NIR_Agile-Light-Source.pdf, 2013, 1 page.

"OL 490 Agile Light Source", URL: www.goochandhousego.com, Bulletin 103 / Rev 9-13, retrieved on Feb. 9, 2022, pp. 1-2.

Mangum et al., "Visible to NIR DLP (R) Hyperspectral Imaging System for Surgical Utility Using Inherent Chromophores and Fluorescent Probes", Proceedings of SPIE—The International Society for Optical Engineering, vol. 7932, Article 793203, Feb. 2011, pp. 1-11.

Kopecek et al., "Laser-Induced Ignition of Methane-Air Mixtures at Pressures up to 4 MPa", Laser Physics, vol. 13, No. 11, 2003, pp. 1365-1369.

Korn et al., "Ultrashort 1-kHz Laser Plasma Hard X-ray Source", Optics Letters, vol. 27, No. 10, 2002, pp. 866-868.

Kozlov et al., "Radiative Losses by Argon Plasma and the Emissive Model of a Continuous Optical Discharge", Soy. Phys. JETP, vol. 39, No. 3, Sep. 1974, pp. 463-468.

Kozlov et al., "Sustained Optical Discharges in Molecular Gases," Sov. Phys. Tech. Phys. vol. 49, No. 11, Nov. 1979, pp. 1283-1287.

Kranzusch et al., "Spatial Characterization of Extreme Ultraviolet Plasmas Generated by Laser Excitation of Xenon Gas Targets", Review of Scientific Instruments, vol. 74, No. 2, 2003, pp. 969-974.

Krushelnick et al., "Plasma Channel Formation and Guiding during High Intensity Short Pulse Laser Plasma Experiments", Physical Review Letters, vol. 78, No. 21, 1997, pp. 4047-4050.

Ku et al., "Decay of Krypton 1(s)(2) and 1(s)(3) Excited Species in the Late Afterglow", Physical Review A, vol. 8, No. 6, 1973, pp. 3123-3130.

(56)　　　　　References Cited

OTHER PUBLICATIONS

Kubiak et al., "Scale-up of a Cluster Jet Laser Plasma Source for Extreme Ultraviolet Lithography", SPIE, vol. 3676, 1999, pp. 669-678.

Kuhn, "Laser Engineering", 1998, pp. 303-343, 365-377, 384-440.

Kurkov et al., "CW Medium-Power Fiber Lasers for Near IR Range", Proceedings of SPIE, vol. 5449, 2004, pp. 62-69.

Lackner et al., "The Optical Spark Plug: Window-related Issues", Institute of Chemical Engineering, Vienna University of Technology, 2005, pp. 1-6.

Lange et al., "Tunable Diode Laser Absorption Spectroscopy for Plasmas at Elevated Pressures", Proceedings of SPIE Vo. 4460, 2002, pp. 177-187.

Laufer et al., "Effect of Temperature on the Vacuum Ultraviolet Transmittance of Lithium Fluoride, Calcium Fluoride, Barium Fluoride, and Sapphire", Journal of The Optical Society of America, vol. 55, No. 1, 1965, pp. 64-66.

Laufer, "Introduction To Optics And Lasers In Engineering", 1996, pp. 449-454.

Legall et al., "Spatial and Spectral Characterization of a Laser Produced Plasma Source for Extreme Ultraviolet Metrology", Review of Scientific Instruments, vol. 75, No. 11, 2004, pp. 4981-4988.

Lenses and Curved Mirrors, University of Delaware, Imaging (last visited Dec. 19, 2015), pp. 24-29.

Leonov et al., "Mechanisms of Resonant Laser Ionization", JETP, vol. 8, No. 4, 1997, pp. 703-715.

Lewis et al., "Measurements of CW Photoionization for the Use in Stable High Pressure Tea Laser Discharge", IEEE Nuclear and Plasma Sciences Society, 1975, pp. 14-45.

Li et al., "Density measurements of a high-density pulsed gas jet for laser-plasma interaction studies", Meas. Sci. Technol., vol. 5, 1994, pp. 1197-1201.

Li, "The Advances and Characteristics of High-Power Diode Laser Materials Processing", Optics and Lasers in Engineering, vol. 34, 2000, pp. 231-253.

Liao et al., "An efficient Ni Kα X-ray Source Driven by a High Energy Fiber CPA System", Center for Ultrafast Optical Science, 2007, pp. CP1-4-THU.

Liao et al., "Generation of Hard X-rays Using an Ultrafast Fiber Laser System", Optics Express, vol. 15, No. 21, 2007, pp. 13942-13948.

Light Hammer, 10 Mark II UV Lamp System, Heraeus Noblelight America LLC, 2015, pp. 1-20.

Light Hammer, 6 UV Lamp System Parts Listing, Heraeus Noblelight America LLC, 2015, pp. 1-22.

Lo et al., "Resonance-Enhanced LIBS", Department of Physics, 2002, pp. 15-17.

Lowe et al., "Developments in Light Sources and Detectors for Atomic Absorption Spectroscopy", Spectrochimica Acta Part B., vol. 54, 1999, pp. 2031-2039.

Lui et al., "Resonance-Enhanced Laser-Induced Plasma Spectroscopy: Time-Resolved Studies and Ambient Gas Effects", Department of Physics, 2002, pp. 19-21.

Luo et al., "Sapphire (0 0 0 1) Surface Modifications Induced by Long-Pulse 1054 nm Laser Irradiation", Applied Surface Science, vol. 253, 2007, pp. 9457-9466.

MacDowell et al., "Reduction imaging with soft x rays for projection lithography", Review Of Scientific Instruments, vol. 63, No. 1, 1992, pp. 737-740.

Maclean et al., "Direct Diode Laser Pumping of a Ti:Sapphire Laser", Institute of Photonics, SUPA, 2009, pp. 1-3.

Magner et al., "Self-Compression of Ultrashort Pulses through Ionization-Induced Spatiotemporal Reshaping", Physical Review Letter, vol. 93, No. 17, 2004, pp. 173902-1-173902-4.

Mahmoud et al., "Ion Formation in Laser-Irradiated Cesium Vapor", Journal of Quantitative Spectroscopy & Radiative Transfer, vol. 102, 2006, pp. 241-250.

Malik et al., "Spectroscopic Measurements on Xenon Plasma in a Hollow Cathode", 2000, J. Phys. D: Appl. Phys., vol. 33, pp. 2037-2048.

Malka et al., "Channel Formation in Long Laser Pulse Interaction with a Helium Gas Jet", Physical Review Letters, vol. 79, No. 16, 1997, pp. 2979-2982.

Mandel'shtam et al., "Investigation of the Spark Discharge Produced in Air by Focusing Laser Radiation II", Soviet Physics JETP, vol. 22, No. 1, 1966, pp. 91-96.

May, "Infrared Optogalvanic Effects in Xenon", Optics Communications, vol. 64, No. 1, 1987, pp. 36-40.

Mazumder et al., "Spectroscopic Studies of Plasma During CW Laser Gas Heating in Flowing Argon", J. Appl. Phys., vol. 62, No. 12, 1987, pp. 4712-4718.

Measures et al., "Fast and Efficient Plasma Heating Through Superelastic Laser Energy Conversion", J. Appl. Phys., vol. 51, No. 7, 1980, pp. 3622-3628.

Measures et al., "Laser interaction based on resonance saturation (LIBORS): an alternative to inverse bremsstrahlung for coupling laser energy into a plasma", 1979, Applied Optics, vol. 18, No. 11, pp. 1824-1827.

Measures et al., "TABLASER: Trace (Element) Analyzer Based on Laser Ablation and Selectively Excited Radiation", Applied Optics, vol. 18, No. 3, 1979, pp. 281-286 (1979).

Measures, "Electron Density and Temperature Elevation of a Potassium Seeded Plasma by Laser Resonance Pumping",J. Quant. Spectrose. Radial. Transfer. vol. 10, 1970, pp. 107-125.

Mercury Vapor Light Source, Model OS-9286A.

Michel et al., "Analysis of Laser-Induced Breakdown Spectroscopy Spectra: The Case for Extreme Value Statistics", Spectrochimica Acta Part B, vol. 62, 2007, pp. 1370-1378.

Michel et al., "Laser-Induced Breakdown Spectroscopy of Bulk Aqueous Solutions at Oceanic Pressures: Evaluation of Key Measurement Parameters", Applied Optics, vol. 46, No. 13, 2007, pp. 2507-2515.

Milian et al., "Dynamic Compensation of Chromatic Aberration in a Programmable Diffractive Lens", Optical Express, vol. 14, No. 20, 2006, pp. 9103-9112.

Millard et al., "Diode Laser Absorption Measurements of Metastable Helium in Glow Discharges", Plasma Sources Sci. Technol., vol. 7, 1998, pp. 288-394.

Mills et al., "Argon-Hydrogen-Strontium Discharge Light Source", IEEE Transactions On Plasma Science, vol. 30, No. 2, 2002, pp. 639-652.

Mills et al., "Excessively Bright Hydrogen-Strontium Discharge Light Source Due to Energy Resonance of Strontium with Hydrogen", J. Plasma Physics, vol. 69, Part 2, 2003, pp. 131-158.

Mizoguchi et al., "Development of Light Source for Lithography at Present and for the Future", vol. 59, No. 166, 2013, pp. 1-7.

Mizoguchi et al., Development of CO2 Laser Produced Xe Plasma EUV Light Source for Microlithography, Proc. Of SPIE, vol. 6151, 2006, pp. 61510S-1.

Reisman et al., "Inductively coupled plasma light source driven by an all solid-state pulsed power system", Applied Physics Letters, vol. 123, Issue 18, Nov. 2, 2023, 6 pages. [retrieved on Oct. 10, 2024], Retrieved from <https:// doi.org/10.1063/5.0174510>.

Extended European Search Report Received for European Patent Application No. 22743017.0, mailed on Nov. 28, 2024, 11 pages.

Anonymous: "Toroidal Mirrors TRseries:Shimadzu Corporation", Oct. 27, 2020, XP093222739, 7 pages. Retrieved from the Internet: URL:https://web.archive.org/web/20201027085809/https://www.shimadzu.com/opt/products/aspherical/o-k25cur0000007p3b.html.

* cited by examiner

INPUT ARRAY

OUTPUT ARRAY

722

720

718

706

710

712
708
702

724

716

711 — 20 mm

750

SPECTRALLY SHAPED LIGHT SOURCE

CROSS REFERENCE TO RELATED APPLICATIONS SECTION

This application is a non-provisional of U.S. Provisional Patent Application Ser. No. 63/140,145, filed on Jan. 21, 2021, entitled "Spectrally Shaped Light Source". The entire contents of U.S. Provisional Patent Application Ser. No. 63/140,145 are herein incorporated by reference.

INTRODUCTION

Numerous commercial and academic applications have need for high brightness light over a broad wavelength range. For example, laser-driven light sources are available that provide high brightness over spectral ranges from the extreme UV through visible and into the infrared regions of the spectrum with high reliability and long lifetimes. Various types of such high-brightness light sources are commercially available from Energetiq, a Hamamatsu Company, located in Wilmington, MA.

The widespread availability of high-brightness light sources, together with growing applications that use high brightness light, has driven the need for systems that shape the spectrum of the optical output of the high-brightness light source. Spectral shaping systems are needed that can provide, for example, specific wavelength distributions. This includes systems that can provide nearly arbitrary shapes of the output spectrum from UV to infrared and also enable programmable and controllable wavelength spectrums of light at an output.

SUMMARY

The present teaching relates to spectrally shaped sources that shape the spectrum of light generated by a high-intensity broadband light source to provide a high-brightness output optical illumination with a desired spectrum. More specifically, the present teaching relates to various embodiments of a high-intensity broadband light source that produce a round-shaped optical beam that is transformed by an input optical element into a rectangular shaped optical beam. An imaging dispersive optical element angularly disperses the wavelengths of the rectangular optical beam in one dimension and images the rectangular optical beam to illuminate a pixelated Spatial Light Modulator (SLM). Selective reflection of the pixelated spatial light modulator illuminated by the dispersed imaged optical beam produces various desired intensities of spectral output in a particular reflected direction towards a toroidal mirror.

In some embodiments of apparatus according to the present teaching, each column of an array of pixels in the pixelated spatial light modulator is illuminated at the same height by a different wavelength in the optical beam. Each column of the array of pixels in the spatial light modulator array that is illuminated is controlled to selectively reflect a desired portion of the light illuminating each column to the toroidal mirror. The toroidal mirror serves to simultaneously focus in the dispersion direction and image the rectangular shaped optical beam at an output plane. This action of the toroidal optic results in the selected portions of the dispersed wavelengths that are reflected toward the toroidal optic being overlapped in an image of the rectangular shape at an output port of the spectrally shaped source, and thus provides output optical illumination comprising a desired spectrum at the output port.

One feature of the spectrally shaped source of the present teaching is that it exhibits very high optical efficiency and can be constructed to be easy to assemble and physically compact. In addition, the spectrally shaped source generates a desired output spectrum that has high resolution and high precision and accuracy. More specifically, the use of a transformed rectangular shape optical beam of the present teaching has at least three key advantages over known systems. First, it improves a resolution of the spectral selectivity of the spectral shaper, much like a slit is used to improve a resolution of a spectrometer. Second, the rectangular shape simplifies the operation of the pixelated spatial light modulator because the modulator is illuminated by rectangular shaped images of the input beam that are separated in wavelength by the dispersive device. Thus, only a height of the illuminated columns of the array needs to be determined to provide a desired intensity of a reflected portion of an optical beam of a given wavelength. Third, the rectangular shape improves the integrity of the provided spectral profile because each reflected portion of a particular wavelength in the spectrum is independent of another reflected portion. In various embodiments, different lengths and positions for the selected portion of the pixel column that are chosen to reflect the optical illumination are used.

The spectrally shaped source of the present teaching includes optical elements positioned so as to support appropriate orientation and position of the various input and output planes as well as the plane of the spatial light modulator for various features, such as compact design, ease of assembly, high resolution, high precision, and high accuracy of spectral output. Various shapes and numbers of pixels, in one or more columns, can be controlled to reflect the portion of the optical beam to the toroidal optic to provide tailoring of the spectrum of the output illumination. Also, a spectral extension source can be optionally coupled to the output of the spectrally shaped source to expand the output spectrum wavelength range of the optical signal. The spectral extension source can be a light emitting diode (LED). The spectral extension source can also be a NIR LED. In addition, a fiber bundle can be used to transform the optical beam shape to provide a highly accurate beam shape with low loss. In addition, optical elements are positioned such that the toroidal optics configuration accommodates "off-axis" mirrors, i.e. 45-degree axis, for Digital Light Processing (DLP) micro-mirror embodiments. Furthermore, various techniques can be employed to provide stray light suppression.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Figure 1:
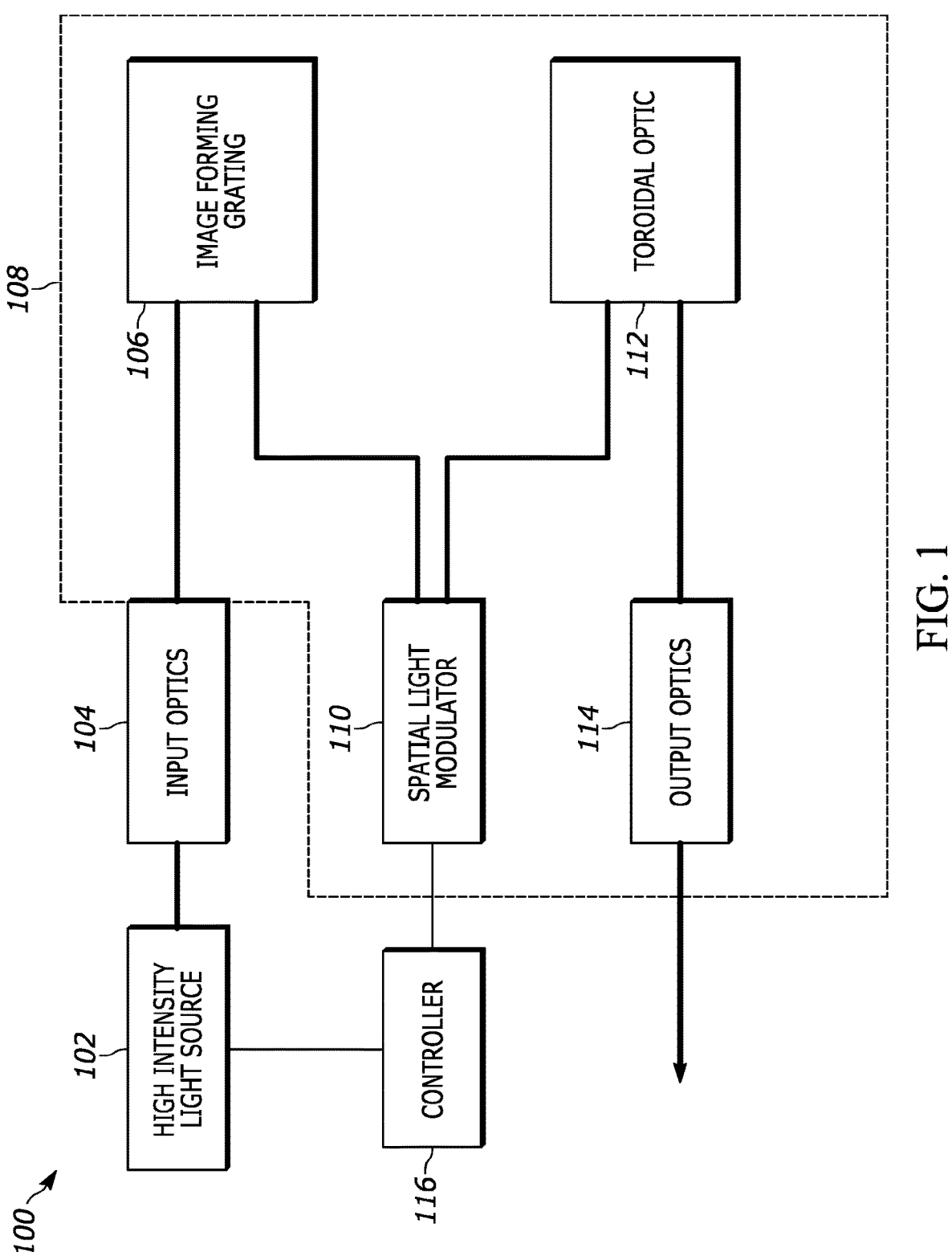
FIG. 1 illustrates a system diagram of an embodiment of a spectrally shaped light source according to the present teaching.

FIG. 1 illustrates a system diagram of an embodiment of a spectrally shaped source 100 according to the present teaching. A high intensity optical source 102 produces high-brightness light at an output. The optical source 102 can be, for example, a high-brightness laser driven light source (LDLS), such as a laser driven xenon lamp, that provides broadband light supplied by a high-intensity plasma at an output. The source 102 can also be, for example, a super continuum fiber laser.

The output light is collected by input optics 104 and directed to an image forming grating 106. The image forming grating 106 in some embodiments is an image forming dispersive device. The input optics 104 can include various optical elements including, for example, bulk optical components and/or fiber optic components. The input optics 104 can transform the spatial output of the light from the source 102 into a desired spatial profile at an input plane of the spectral shaper system 108. The image forming grating spatially separates the wavelengths of the light from the input and directs the light to a spatial light modulator 110.

The spatial light modulator 110 modulates the light in the spatially separated wavelengths of light independently and directs them to a toroidal optic element 112. In some embodiments, the spatial light modulator is a pixelated spatial light modulator. In some embodiments the pixels form a one-dimensional array. In some embodiments, the pixels form a two-dimensional array. In some embodiments, the pixelated spatial light modulator 110 comprises a digital micro-mirror device (DMD). In some embodiments, the pixelated spatial light modulator comprises a liquid crystal on silicon (LCOS) device. Also, in some embodiments, the pixelated spatial light modulator 110 includes an order-sorting filter that increases spectral purity.

The toroidal optic element 112 directs the light reflected toward the toroidal optical element 112 by the spatial light modulator 110 to output optics 114. The toroidal optic element 112 collects and focuses light from the spatial light modulator 110. Some embodiments of the toroidal optic element utilize a reflective surface with a toroidal shape that recombines the spatially separated wavelengths of light and images the light from the surface of the modulator that are directed to the toroidal optic to an output plane. The output optics 114 can include various optical elements including, for example, bulk optical components and/or fiber optic components and can be used, for example, to couple the imaged optical light into an optical fiber or other lightguide.

A controller 116 is connected to the high-intensity light source and/or the spatial light modulator 110 to control the modulation of the light to provide a desired optical spectrum at the output of the output optics 114. In some embodiments, the controller 116 operates in an open-loop configuration, and uses, for example, pre-loaded spectrum files to determine how to control the spatial light modulator. For example, the pre-loaded spectrum files can include how many pixels in a column of the modulator 110 associated with a particular wavelength are directing light toward the toroidal optical element 112. In these embodiments, no external sensor and/or spectrometer is needed to adjust the spectral profile. This feature is possible because of the precise shaping and spectral imaging of the optical beams in the system. The input beam and the image forming grating 106 are configured to illumination a precise shape and size of a region on the modulator with a particular desired wavelength. Because of the precise illumination region size and shape, the number and position of pixels illuminated by the desired wavelength in the region can be determined. A pixel in the "on state" reflects light, while a pixel in the "off state" does not reflect light. Therefore, the intensity of light reflected from the region is controlled by controlling the number of pixels in the "on state". Thus, it is possible to produce a desired intensity of a particular wavelength at the output only by controlling the number of pixels in the "on state" in the illuminated region. In some embodiments, the size and shape of the image beam is a rectangular shape that illuminates one column of a two dimensional array of pixels in the modulator.

Various embodiments of the spectral shaper system 108 may or may not include specific input optics 104 or output optics 114, depending on the application. Some embodiments of the spectral shaper systems 108 can include an internal controller with pre-loaded control algorithms for controlling the spatial light modulator to provide desired spectral shapes of the output light.

One feature of the present teaching is that the spectrally shaped source 100 can include input optics 104 that spatially shape the high-brightness light from the optical source 102 to provide a spatial profile at an input plane of the shaper that produces a desired image at the plane of the spatial light modulator 110 after transformation by the image forming grating 106. For example, in some embodiments, it is desirable that the spatial profile of light at an input plane of the shaper optical system 108 have a substantially rectangular shape. The light that emerges from the high-brightness source 102 can be, for example, generally a circular shape. Thus, in some embodiments, the input optics 104 performs a transformation from a circular shape input to a rectangular shape output.

Figure 2A:
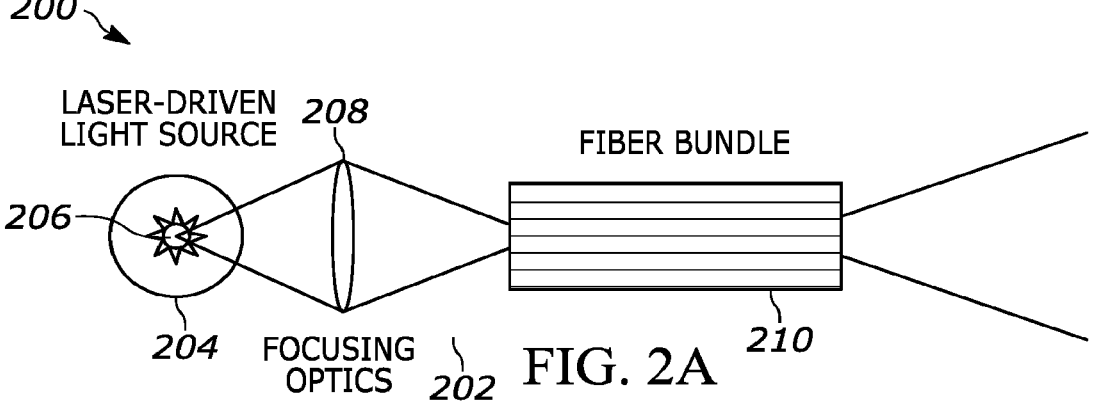
FIG. 2A illustrates a schematic of an embodiment of the input optics and light source for a spectrally shaped source according to the present teaching.

FIG. 2A illustrates a schematic of some elements 200 including the input optics 202 and light source 204 for an embodiment of a spectrally shaped source according to the present teaching. The light source 204 generates light from a high-intensity plasma 206 that diverges from the light source 204. Focusing optics 208 in the input optics 202 collect the divergent light from the light source 204 and focus the light to an input of an optical fiber bundle 210. In some embodiments, the fiber bundle 210 is configured to transform a shape of the focused beam that is coupled at the input of the fiber to a desired output shape.

Figure 2B:
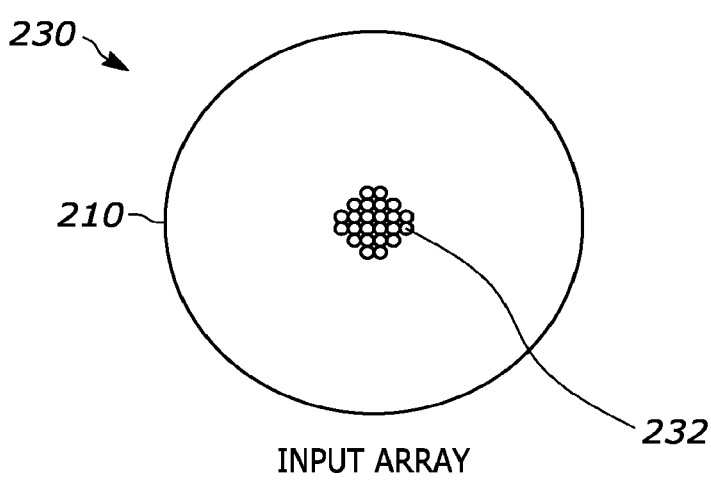
FIG. 2B illustrates an input cross section of an embodiment of a fiber bundle for a spectrally shaped source according to the present teaching.

FIG. 2B illustrates an input cross section 230 of an embodiment of a fiber bundle 210 for a spectrally shaped source according to the present teaching. Individual fibers 232 in the bundle are arranged in a nominally circular shape at the input.

Figure 2C:
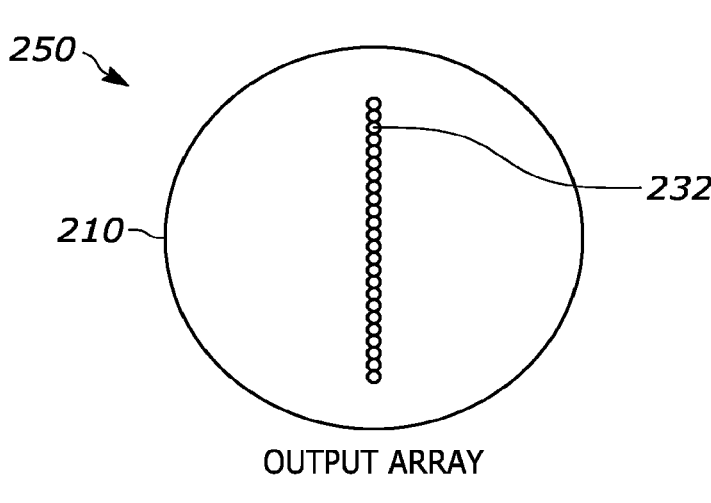
FIG. 2C illustrates an output cross section of an embodiment of a fiber bundle for a spectrally shaped source according to the present teaching.

FIG. 2C illustrates an output cross section of an embodiment of the fiber bundle 210 for a spectrally shaped source according to the present teaching. Individual fibers 232 in the bundle are arranged in a nominally rectangular shape at the input. In this embodiment, that shape is provided by a single column of 24 fibers. Other embodiments can use different aspect ratios of height-to-width of the rectangular shape and/or different numbers of fibers. The transformation from circular shape to rectangular shape is achieved by rearranging the positions of the fibers 232 over the length of the bundle 210 to realize the desired shape transformation. As understood by those skilled in the art, numerous shapes and shape transformations can be achieved using a fiber bundle. In some embodiments, a shape of an input cross-section of the fiber bundle is provided that closely matches an image of a plasma 206 or other light-generating element in the source 204. In some embodiments, a shape of the output cross-section of the fiber bundle 210 is provided that has a rectangular shape that is matched to a shape of a pixel, or group of pixels, in the spatial light modulator in the shaper system.

Figure 3:
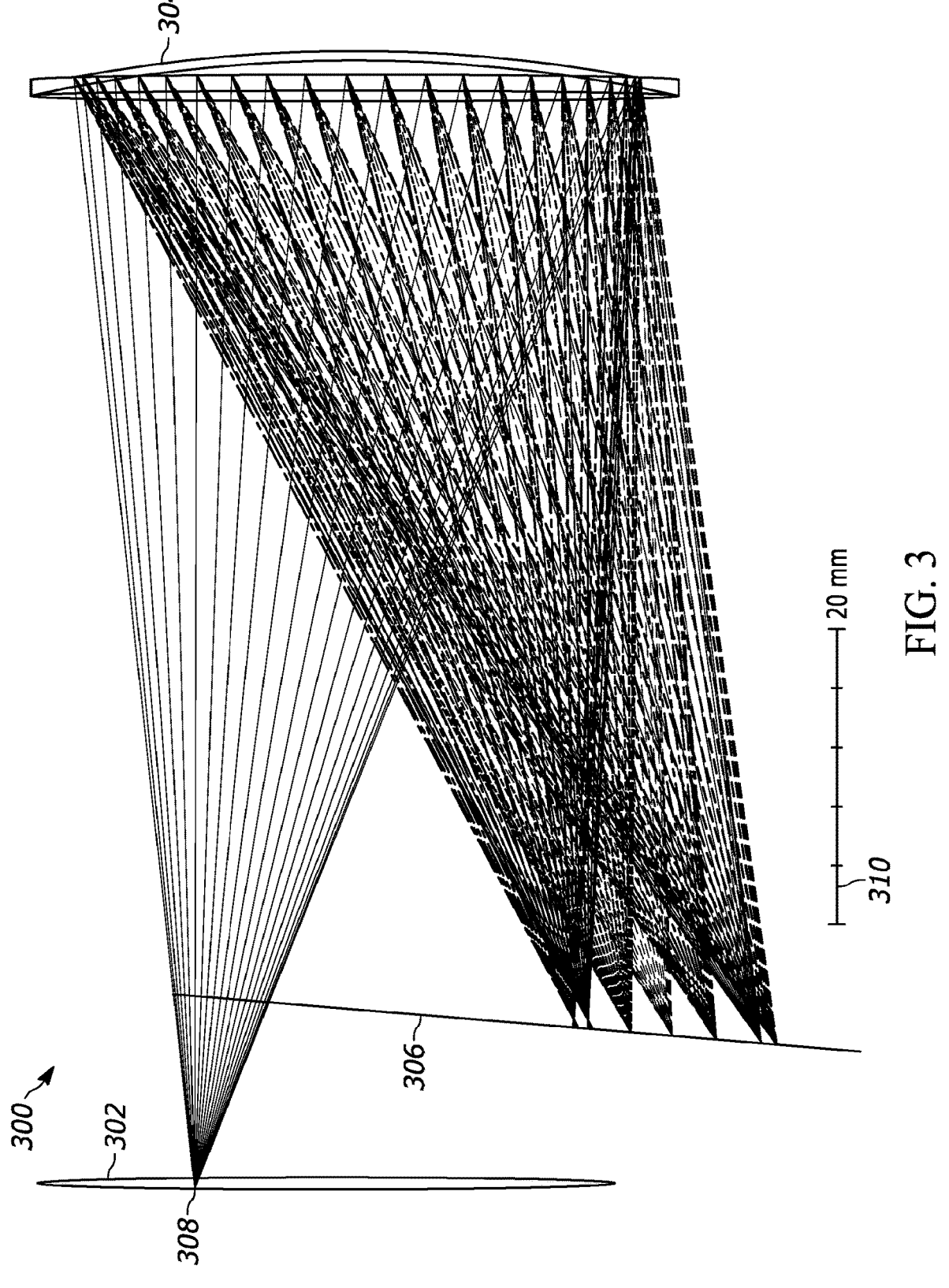
FIG. 3 illustrates a perspective view of an embodiment of part of the spectral shaper system that includes the input fiber plane, image forming dispersive device, and spatial light modulator plane of a spectrally shaped source according to the present teaching.

FIG. 3 illustrates a perspective view of an embodiment of part of a spectral shaper system 300 that includes the input fiber plane 302, image forming dispersive device 304, and spatial light modulator plane 306 of a spectrally shaped source according to the present teaching. A length scale 310 is indicated. This length scale 310 is exemplary and shaper systems of the present teaching are not limited to this size or shape as understood by those skilled in the art.

Input light, which can be white light or other broadband light, is introduced into the shaper as an optical beam 308 having a particular shape. The shape may be provided by passing the optical beam 308 through a fiber array. While a fiber array is described herein, other input optics can be used to provide an input optical beam 308 with a desired shape at the input plane 302. The fiber array can be, for example, a straight-line fiber-array or a rectangular array or other shape. In some embodiments, the fiber array is a straight-line fiber-array constructed from a multi-strand fiber bundle with a circular input bundle cross-section and a straight-line output end. In some embodiments, the light from the array is formed in a shape of a rectangular optical beam 308.

The light in the optical beam 308 from the array is then directed to the image forming dispersive device 304 that separates the spectrum of the light in the shaped optical beam into spatially separated beams. Thus, the image forming dispersive device 304 angularly disperses wavelengths of the optical beam in a dispersion direction and images the shape of the optical beam at a modulation plane 306. In some configurations according to the present teaching, the optical beam is formed in a rectangular shape. In some embodiments, the image forming dispersive device 304 is a concave, aberration-corrected, image-forming grating. The use of a curved dispersive element to image the input optical beam can eliminate the need for an extra optical element, such as a lens, needed in the shaper system to perform the imaging.

The image forming dispersive device 304 produces an image of the fiber-array 308 output at the input plane 302 onto a surface of a spatial light modulator (not shown) positioned in a modulator plane 306. Different wavelengths of light separated by the dispersive device 304 are separately imaged onto different modulator regions. In some configurations according to the present teaching, the input light is a rectangle shape and modulator regions are columns of an array of pixels that form the modulator. For example, for an individual wavelength of input light, the dispersive element forms an image of the input light beam shape onto a specific column of a modulator.

For a broadband light input, images of the input shape at different wavelengths are formed on different columns of the pixelated modulator, forming a rainbow across the columns. In some embodiments, the modulator is a DMD modulator, and the different wavelength images coincide with different micro-mirror pixel columns. Various descriptions herein will refer to particular rows and/or columns of pixels as representing one dimension of the array without loss of generality, as the relative orientation of the array is arbitrary as understood by those skilled in the art.

In some embodiments, the input plane 302 and the modulator plane 306 are different planes, and a normal to the input plane 302 is not collinear with a normal to the modulator plane 306. This configuration assists in providing a compact three-dimensional package for the optical system, which maintains a high-quality image of the optical input shape at the modulator plane 306.

Figure 4:
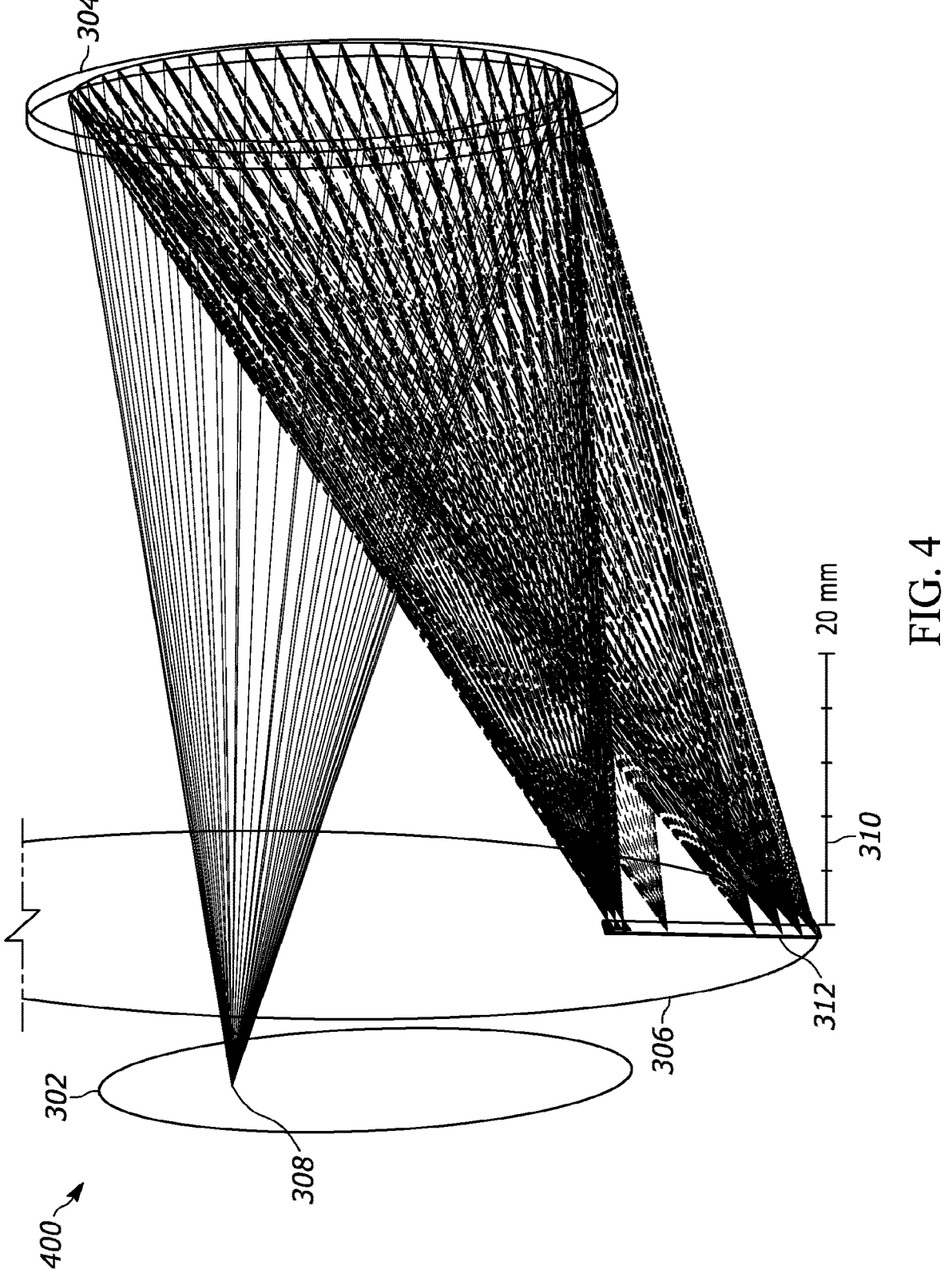
FIG. 4 illustrates another perspective view of the embodiment of the spectral shaper system that includes the input fiber plane, image forming grating, and spatial light modulator plane of the spectrally shaped source of FIG. 3.

FIG. 4 illustrates another perspective view of the embodiment of the spectral shaper system 400 including the input fiber plane 302, image forming dispersive device 304, and spatial light modulator plane 306 for the spectrally shaped source of FIG. 3. The length scale 310 is also shown. The fiber array 308 and modulator 312 are shown. This view shows the three surfaces of the array, a view at the input plane 302, a view at the concave surface of the dispersive device 304 that spreads the individual wavelengths in space to form images at different wavelengths, and a view at the plane 306 of the input to the modulator 312. Each wavelength that emerges at a different angle from the dispersive device 304 forms a separate image of the input array 308 in different regions of the modulator 312 based on the wavelength separation provided by the grating and the curvature of the dispersive device 304. In some embodiments, the dispersive device 304 also provides correction for spherical aberration.

In some embodiments, an order-sorting filter is positioned in the path between the image forming dispersive device 304 and the modulator 312. The order-sorting filter can be positioned on or integrated into the image forming dispersive device 304 and/or the modulator 312. The order-sorting filter enhances the spectral purity of the spectrum in the image plane by rejecting the second-order of shorter-wavelength light from mixing with the first-order light. The first and second orders have a wavelength difference of a factor of two. For example, a 400 nm second order wavelength is rejected and will not overlap with the 800 nm first order wavelength of light.

Figure 5:
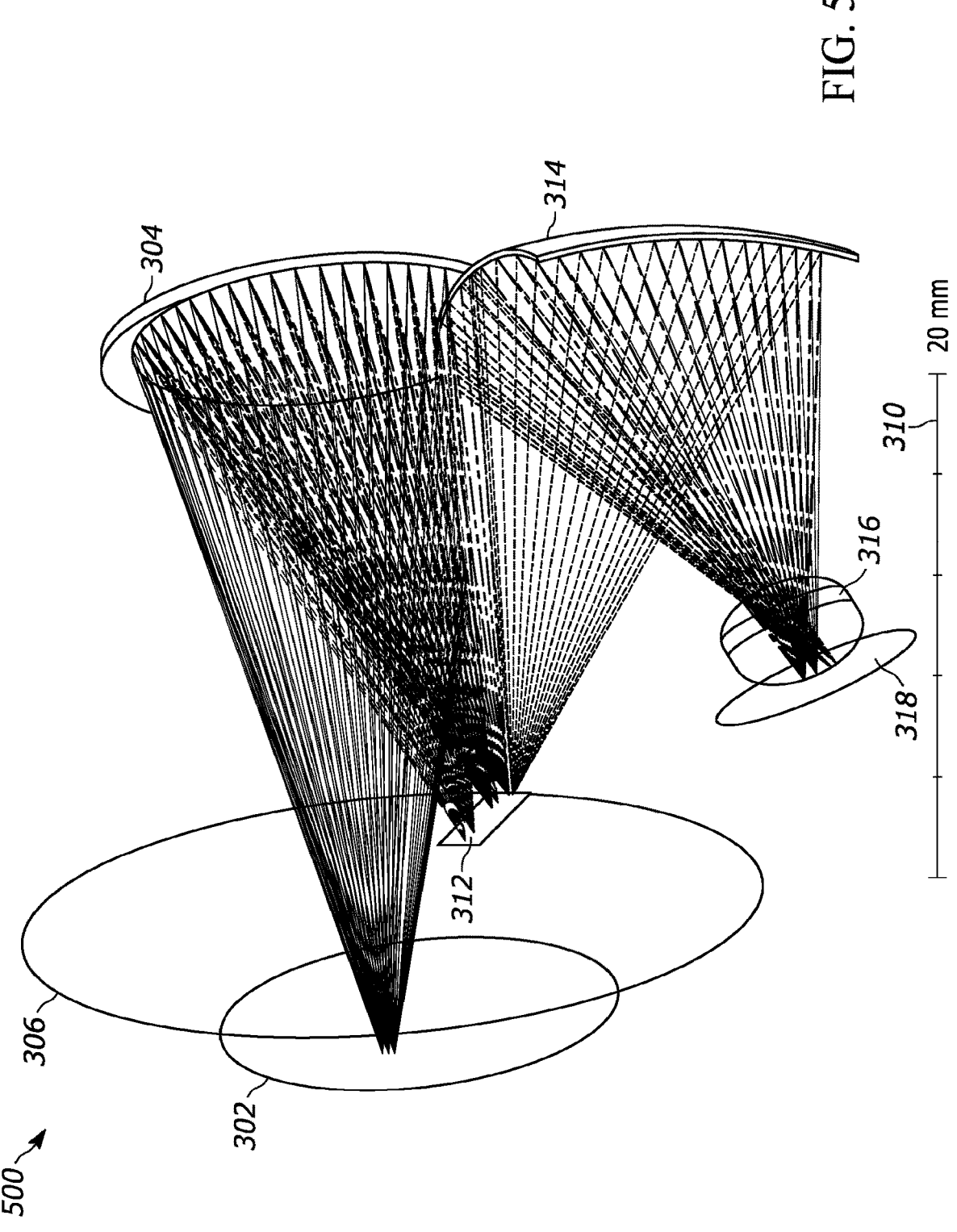
FIG. 5 illustrates another perspective view of the embodiment of the spectral shaper system that includes the input fiber plane, image forming grating, spatial light modulator plane, toroidal mirror, and output optics of the spectrally shaped source of FIG. 3.

FIG. 5 illustrates another perspective view of the embodiment of the spectral shaper system 500 including the input fiber plane 302, image forming dispersive device 304, spatial light modulator plane 306, toroidal mirror 314, and output optics 316 for the spectrally shaped source of FIG. 3. The length scale 310 is also shown. The system includes the fiber array 308 and the modulator 312 shown in FIG. 4. A toroidal mirror 314 and output optics 316, which in this embodiment is a lens, are used to project the optical light directed from the modulator 312 to the toroidal mirror 314 to an output plane 318 of the shaper system 500. The modulator 312 is controlled to direct light from some regions of the modulator 312 toward the toroidal mirror 314 while directing light from other regions of the modulator 312 away from the toroidal mirror 314. For example, in some embodiments, light from one or more pixels of a DMD is directed toward the mirror 314 and light from other pixels is directed away from the mirror 314.

In some embodiments, the modulator 312 is a two-dimensional array of pixels comprising rows and columns of pixels. Light from a rectangular shaped optical beam at the input plane 312 is imaged such that a width and height of the imaged rectangle at the modulator plane 306 corresponds to a width and height of a column of pixels. The spatial separation of wavelengths by the dispersive device 304 causes different wavelengths of light to illuminate different columns of pixels. A controller (not shown in FIG. 5) is used to configure each of the pixels in the modulator 312 to direct light toward or away from the toroidal mirror 314.

The dispersive device 304 configuration determines the central wavelength and spectral bandwidth around the central wavelength, which can be referred to as a spectral segment, that is directed to each column of pixels in the modulator 312. A certain fraction of the pixels in a column are then controlled to direct the light to the mirror 314, while the remaining pixels direct light away from the mirror 314. Different columns correspond to different spectral segments of light. In this way, a controlled fraction of the intensity of light in a particular spectral segment that is directed to the mirror 314 is then reflected by the mirror 314 to the output, thereby providing a controlled intensity of light in the spectral segment at the shaper output. Because different spectral segments associated with different columns are independently controlled, this feature provides a controlled shape of the intensity as a function of wavelength at the shaper system output.

One feature of using the rectangular shape of the optical light at the input plane 302 as described is that a very low loss, or high throughput efficiency can be realized. This occurs because the image efficiently illuminates the surface of a rectangular modulator 312 so nearly all the input light impinges to a pixel and nearly all light directed by the modulator to the toroidal mirror 314 appears at the output plane 318. Also, high accuracy of intensity is provided because the pixels are uniformly illuminated. It should be understood that in various embodiments, different shapes of image from the input plane 302 to the modulator plane 306, as well as different shapes of illuminated regions on the modulator 312, are also possible.

One feature of the present teaching is that the image formed by the image forming dispersive device 304 of the rectangular shaped input optical beam illuminates the pixels in columns of the modulator 312 at a uniform height. In this case, a height of pixels in a column associated with a particular wavelength that are controlled to reflect the light from the surface of the modulator 312 toward the toroidal mirror 314 determines the fraction of the illumination in that wavelength that appears at the output. Controlling the various heights of the columns of the pixels in the modulator then provides a desired spectral shape of the illumination at the output plane 318.

Also, the amount of light reflected toward the toroidal mirror in a given wavelength band associated with a column of the spatial light modulator 312 can be determined by a number of pixels in that column that are controlled to direct light to the toroidal mirror 314. Thus, in some embodiments, a number of pixels in at least one column of pixels that is illuminated by the angularly dispersed wavelengths of the rectangular optical beam imaged by the image forming dispersive device is chosen to provide a desired spectral shape of the output optical illumination at the output plane 318.

The toroidal mirror 314 is configured with a reflective surface in a shape that spatially recombines the wavelengths from the spatial light modulator 312 that are directed to the surface of the mirror 314 and direct them to the output optics 316. The output optics 316 couple the spatially recombined light into a desired receiving optical system (not shown) positioned at an output plane 318 of the shaper system 500. The output optics 316 in some embodiments is an output lens that couples the output light directed off of the toroidal mirror 314 to a liquid light guide (not shown). Other optical systems for receiving the optical beam from the output plane 318 are also possible as can be based on a particular application.

Figure 6:
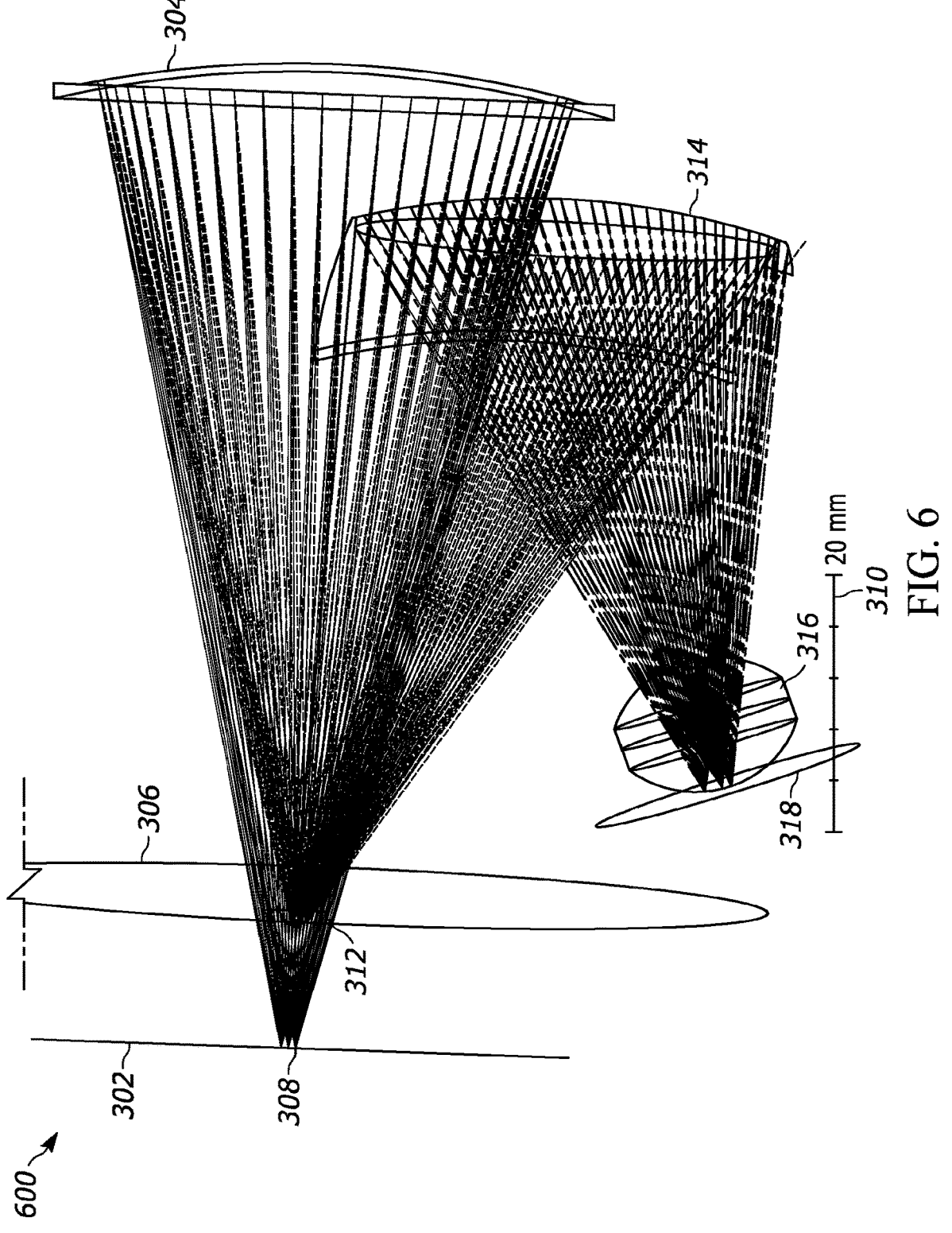
FIG. 6 illustrates another perspective view of the embodiment of the spectral shaper system including the input fiber plane, image forming grating, spatial light modulator plane, toroidal mirror and output optics of the spectrally shaped source of FIG. 3 that illustrates the input.

FIG. 6 illustrates another perspective view of the spectral shaper system 600 including the input fiber plane 302, image forming dispersive device 304, spatial light modulator plane 306, toroidal mirror 314, and output optics 316 of the spectrally shaped source of FIG. 3. This view of the shaper system 600 illustrates an optical axis through the input plane 302 to the dispersive device 304 and how the dispersive device 304 directs the light to the modulator plane 306 with a normal that is non-collinear with the optical axis through the input plane 302 to the dispersive element 304. This view of the shaper system 600 also shows how the toroidal mirror 314 has a three-dimensional toroidal surface shape that both spatially recombines the wavelengths that are directed toward the mirror 314 and directs them towards the output plane 318.

The embodiment of the spectral shaping system shown in FIGS. 3-6 is illustrated with the dispersive device, modulator, and toroidal optical elements configured as reflective devices. It should be understood that one or more of those elements can be configured as a transmissive device with well understood modifications to the optical system and still be consistent with a spectral shaper system of the present teaching.

One feature of the spectral shaping system of the present teaching is that it can be designed to accommodate multiple wavelength ranges of interest. For example, embodiments of the system operate over a wavelength range from ~380 nm to ~760 nm. This may be referred to as the UV and visible region of the spectrum. Embodiments of the system also operate over a wavelength range from ~380 nm to ~1100 nm. This extended wavelength range includes spectral components in the near infrared (NIR) region of the spectrum, nominally from ~760 nm to ~1100 nm.

Some embodiments of the spectral shaper according to the present teaching produce spectral shaping in the NIR region of the spectrum that share the image-forming dispersive element and modulator, but have different input configurations for the UV and/or visible light and the NIR light. These embodiments locate the shaped optical beam in the NIR region of the spectrum at a position that generates astigmatism aberrations from the image forming dispersive device, and then these aberrations are used to locate the NIR spectrum at a different position on the surface of the spatial light modulator from the visible/UV spectrum. Thus, the NIR spectral components and visible and/or UV components can be independently controlled because they illuminate different pixel columns.

Figure 7A:
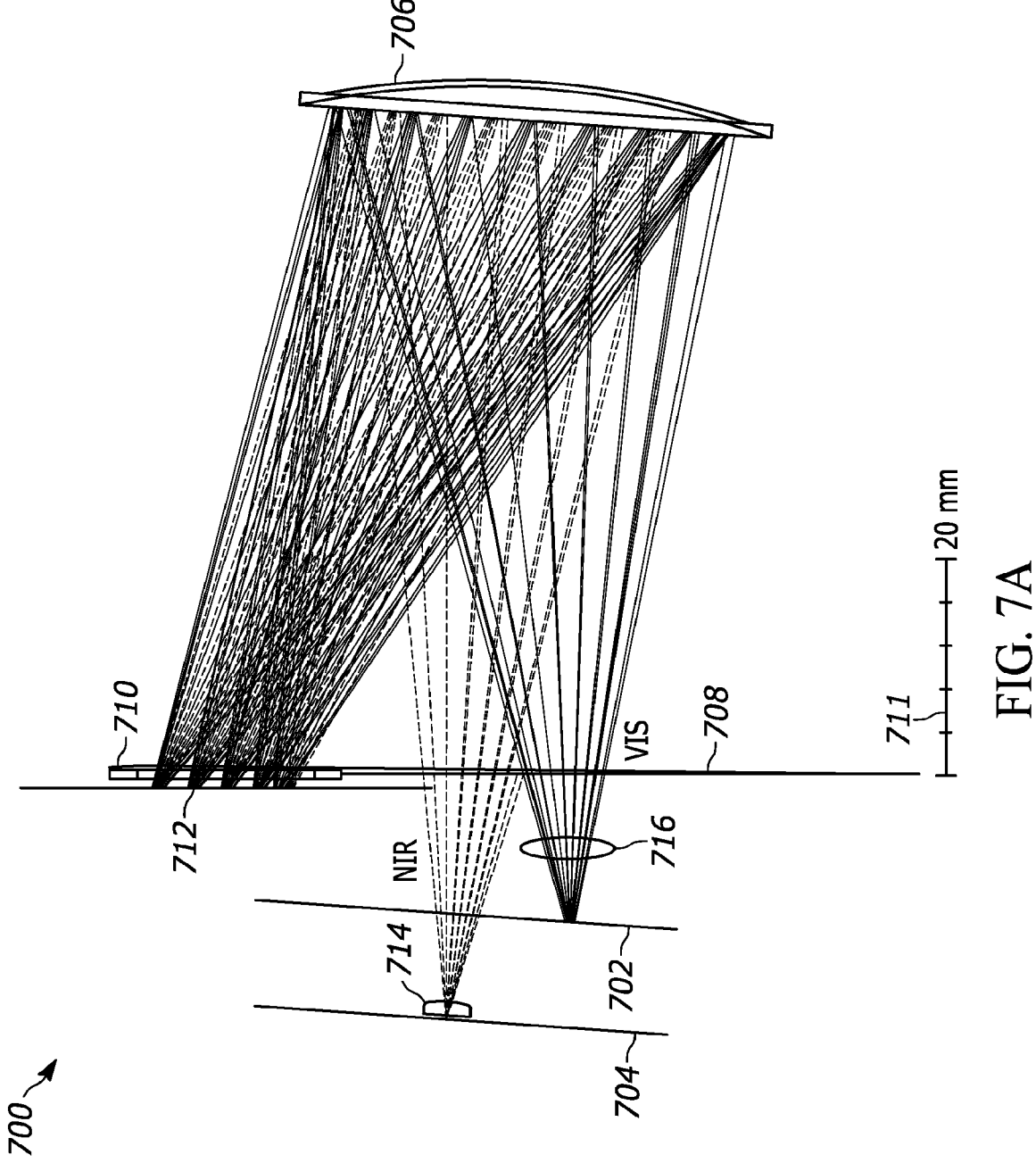
FIG. 7A illustrates a perspective view of an embodiment of the input planes, image forming dispersive device, and spatial light modulator plane of a spectral shaper system for an infrared-extended spectrally shaped source according to the present teaching.

FIG. 7A illustrates a perspective view of an embodiment of a spectral shaper system 700 including the input planes 702, 704, image forming dispersive device 706, and spatial light modulator plane 708 of an infrared-extended spectrally shaped source according to the present teaching. The shaper system 700 shown in perspective view 700 has a length scale 711 indicated. This length scale 710 is exemplary and NIR-extended shaper systems of the present teaching are not limited to this size or shape as understood by those skilled in the art.

Visible and/or ultraviolet input light is introduced into the shaper system 700 as an optical beam having a rectangular shape at the visible input plane 702. In some embodiments, the visible light is a line shape. Near infrared light is input at a NIR input plane 704. In some embodiments, the NIR light is input as a point source shape. The light from the visible input plane 702 and the light from the NIR input plane 704 is directed to the image forming dispersive device 706. The image forming dispersive device 706 separates the spectrum of the light in the shaped optical beams from the NIR and visible planes 702, 704 into spatially separated beams and directs them to the spatial light modulator window 710 positioned at a spatial light modulator plane 708 such that the NIR spectrum is parallel to the visible spectrum on the modulator 712 positioned just behind the window 710. The NIR subsystem shares the same optical path with the visible system. In some embodiments, the visible light is provided by a fiber bundle with a linear array of fibers at the output cross section. This produces a line shape. In some embodiments, the NIR system is nominally a point source. This point source can be provided, for example, from a single optical fiber output.

The NIR shares this path until it is coupled into an output optical device, which may be a liquid light guide. Both of the visible and NIR spectra are located on the spatial light modulator with a spatial gap, so they can be independently manipulated by the spatial light modulator 712 and controller (not shown). In this embodiment, the NIR input is offset from an optimum input position that would have no aberration. The offset position introduces astigmatism from the image forming dispersive device 706, which serves to generate a line shape of NIR light at the spatial light modulator 712 from the point source shape of the NIR input light. The aberrations also serve to locate the NIR spectrum at a different position from the visible light on the modulator 712. In contrast, the visible input, which is a line source shape is imaged with no aberration.

Similar to the embodiment described in connection with FIG. 3, the image forming dispersive device 706 of the embodiment of FIG. 7A produces an image of the shaped optical beam at the visible input plane 702 and the NIR input plane 704 at the modulator plane 306 (FIG. 3). Different wavelengths of light separated by the dispersive device 706 are separately imaged onto different modulator pixel regions. In some embodiments, the modulator is a DMD modulator, and the different wavelength images coincide with different DMD pixel columns. In some embodiments, the input planes 702, 704 and the modulator plane 708 are different planes, providing a compact three-dimensional package for the optical system. Optionally, an optical wedge 714 can be used to project the NIR optical beam, and an optical aperture 716 can be used to aperture the visible and/or UV optical beam from the input planes 702, 704.

Figure 7B:
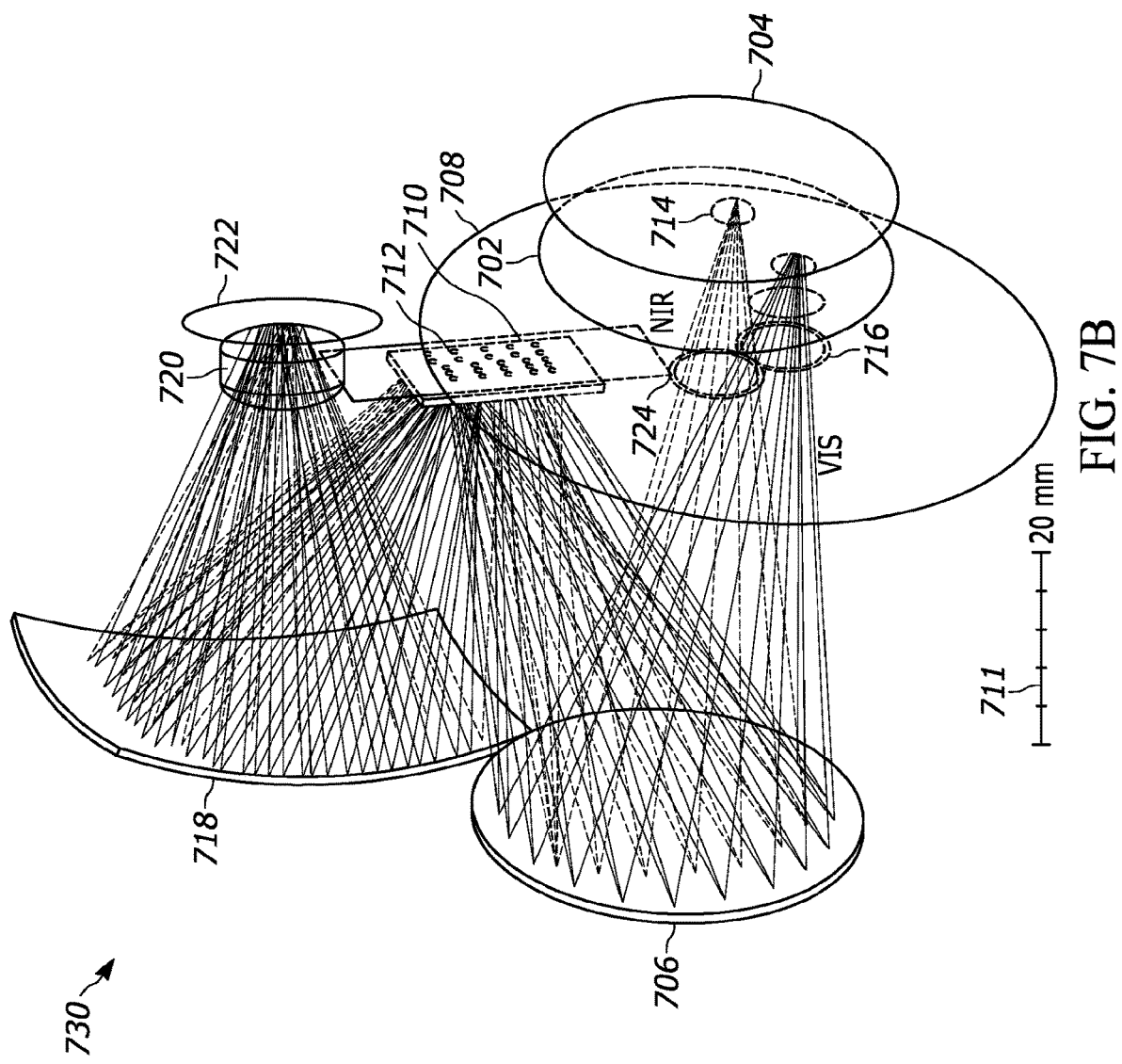
FIG. 7B illustrates another perspective view of the embodiment of the spectral shaper system for an infrared-extended spectrally shaped source of FIG. 7A.

FIG. 7B illustrates another perspective view 730 of the spectral shaper system for an infrared-extended spectrally shaped source of FIG. 7A. The length scale 711 is shown. This view 730 shows the visible input plane 702 and the visible line source optical beam that enters the system at that plane 702. The NIR optical beam input is a point source at the NIR plane 704 that passes through the optical wedge 714. The NIR light passes an aperture 724 and the visible light also passes and aperture 716 and then both beams impinge the image-forming dispersive device 706. The image-forming dispersive device 706 spatially separates the wavelengths of light of both the visible and NIR light. The image-forming dispersive device 706 images different color points of light from the NIR light and different colored lines of light from the visible light to the spatial light modulator 712 after passing through the window 710.

A controller (not shown) is used to control the spatial light modulator 712 such that a desired amount of light from each color is directed to the toroidal mirror 718 that spatially recombines the wavelengths and directs the desired amount of light from each color to a collection lens 720. The collection lens provides an optical beam at an output plane 722 with a desired spectral shape of the output optical illumination.

Figure 7C:
FIG. 7C illustrates yet another perspective view of the embodiment of the spectral shaper system for an infrared-extended spectrally shaped source of FIG. 7A.

FIG. 7C illustrates a portion of yet another perspective view of the spectral shaper system 750 for the infrared-extended spectrally shaped source of FIG. 7A. The visible input plane 702, NIR input plane 704, image forming dispersive device 706, spatial light modulator plane 708, spatial light modulator window 710, spatial light modulator 712, toroidal optical mirror 718, collection lens 720, and output plane 722 are shown. The scale 711 is indicated. This view of the spectral shaper system 750 illustrate the complex three-dimensional trajectories of the optical beams that pass through the system. This is why a toroidal mirror 718 is needed to both spatially recombine the wavelengths dispersed by the dispersive device 706 and to re-image the light at the output plane 722.

Figure 8B:
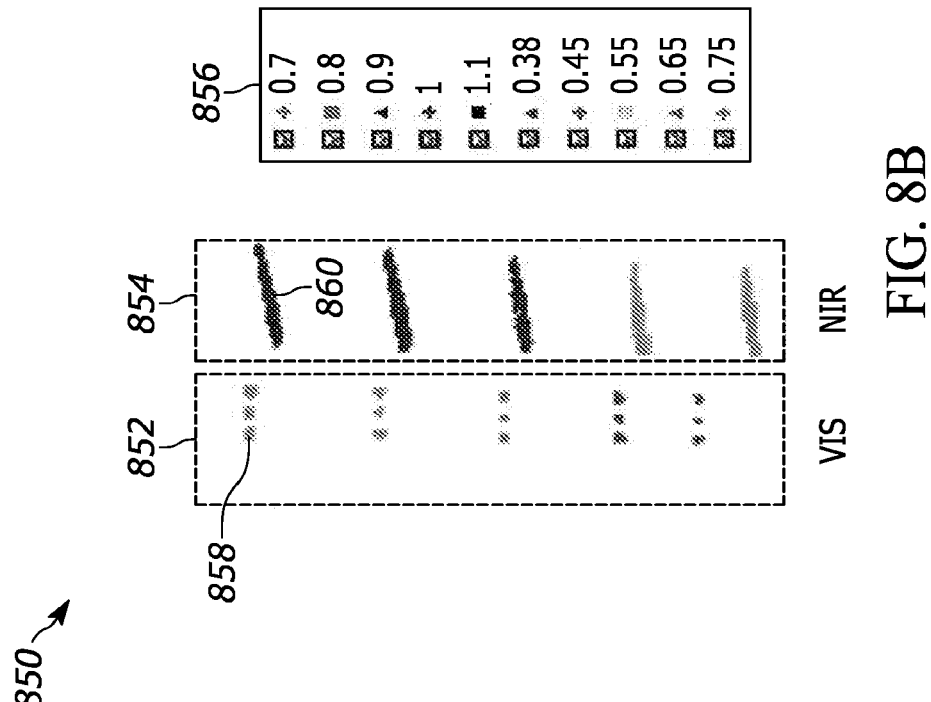
FIG. 8B illustrates the illumination of modulator regions of visible and NIR light from a face-on view of the system of FIG. 8A.
Figure 8A:
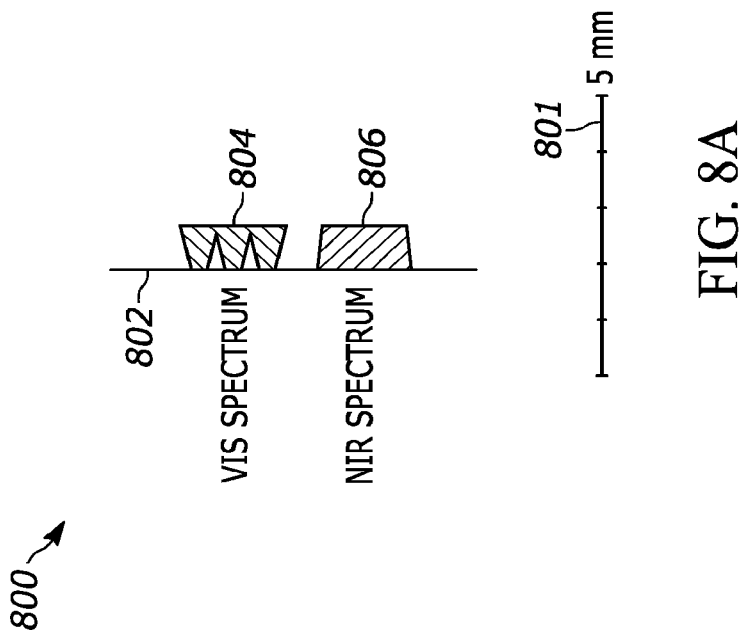
FIG. 8A illustrates the illumination of a modulator showing the light from the visible spectrum and the NIR spectrum of a spectral shaper of the present teaching.

FIG. 8A illustrates the illumination 800 of a modulator 802 showing the illumination from the visible spectrum 804 and the NIR spectrum 806 of a spectral shaper system of the present teaching. A length scale 801 is provided. The light from the visible spectrum 804 and the NIR spectrum 806 share the same modulator 802. The visible light 804 impinges the top half of the modulator 802, and exhibits high resolution due to lower aberrations from the imaging dispersive device. The NIR light 806 impinges on the bottom half of the modulator 802 and exhibits lower resolution due to aberration in the imaging dispersive device. Thus, the two spectra 804, 806 are spatially separated and there is only minimal wavelength range overlap. In some embodiments, bandpass filters are used.

FIG. 8B illustrates the illumination 850 of the modulator regions 852, 856 from a face-on view of the system of FIG. 8A. A wavelength scale 856 is shown, with different wavelengths of light having different symbols and different grey scale levels in the simulation in the regions 852, 854. In the NIR spectrum region 854, for each wavelength, the spectral lines 860 are tilted and parallel with the spectral lines of other wavelengths. As a result, the output for the NIR is a line image when these lines are recombined in the toroidal mirror. The visible light 858 has higher resolution, and the input array shape is imaged on the modulator 802 and also at the output of the shaper system after being recombined in the toroidal mirror. Note that although individual circular array elements from a linear array of optical fibers provided at the input are resolved as three individual spots, such a pattern can be referred to as a line shape or a rectangular shape. Generally, in connection with the apparatus according to the present teaching, the visible spectrum 804 covers a range from ~380 nm to ~750 nm, and the NIR spectrum 806 covers a range from ~700 nm to ~1100 nm.

Figures 9A, 9B:
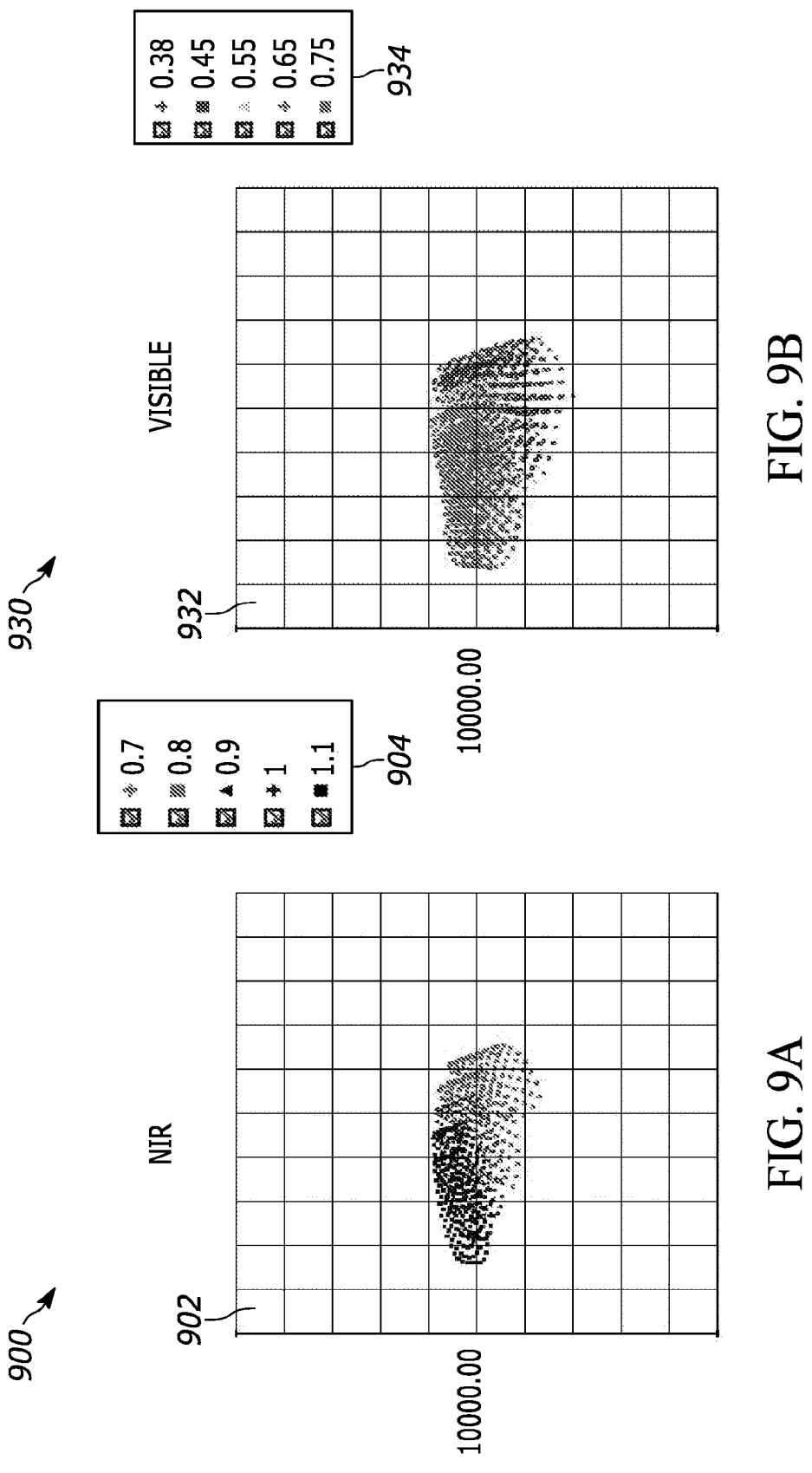
FIG. 9A illustrates a simulation of the spatial distribution of an output beam spot in the near-infrared region of the spectrum of an embodiment of the spatial shaper system of the present teaching.
FIG. 9B illustrates a simulation of the spatial distribution of an output beam spot in the visible region of the spectrum of an embodiment of the spatial shaper system of the present teaching.

FIG. 9A illustrates a simulation of the spatial distribution 900 of an output beam spot in the near-infrared region of the spectrum of an embodiment of the spectral shaper system of the present teaching. The grid squares 902 are one-millimeter square. The legend 904 refers to the grey scale in the figure which shows different wavelengths from 0.7 micrometers to 1.1 micrometers. The spatial distribution 900 represents the spot size at the input surface to, for example, an output liquid light guide coupled to the shaper system (not shown).

FIG. 9B illustrates a simulation of the spatial distribution 930 of an output beam spot in the visible region of the spectrum of an embodiment of the spatial shaper system of the present teaching. The grid squares 932 are one-millimeter square. The legend 934 refers to the grey scale representing different wavelengths from 0.38 micrometers to 0.75 micrometers. The spatial distribution 930 represents the spot size at the input surface to, for example, an output liquid light guide coupled to the shaper (not shown).

Figure 9C:
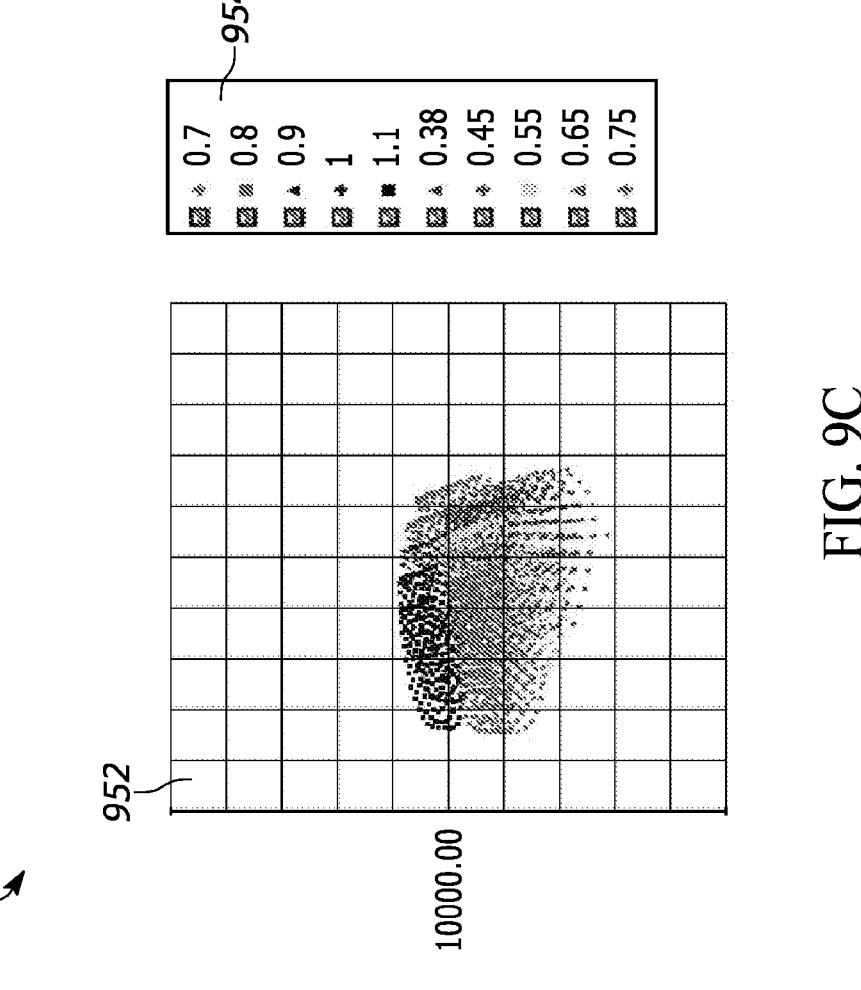
FIG. 9C illustrates a simulation of the composite spatial distribution of an output beam spot in the near-infrared and visible regions of the spectrum of the embodiment of the spatial shaper system of FIGS. 9A and 9B.

FIG. 9C illustrates a simulation of the composite spatial distribution 950 of an output beam spot in the near-infrared and visible regions of the spectrum of the embodiment of the spatial shaper system of FIGS. 9A and 9B. The grid squares 952 are one-millimeter square. The legend 954 refers to the grey scale in the figure representing different wavelengths from 0.38 micrometers to 1.0 micrometers. The spatial distribution 950 represents the spot size at the input surface to, for example, an output liquid light guide coupled to the shaper system (not shown). This result is achieved with visible and NIR that share the same optics in the spectral shaper system. The output of the shaper system has the visible and NIR light overlapped onto a small area. The area has a dimension of approximately four millimeters by five and a half millimeters. This size and shape of a spatial distribution 950 at the output plane of the spectral shaper can be efficiently collected by a liquid light guide.

Figures 10A, 10B:
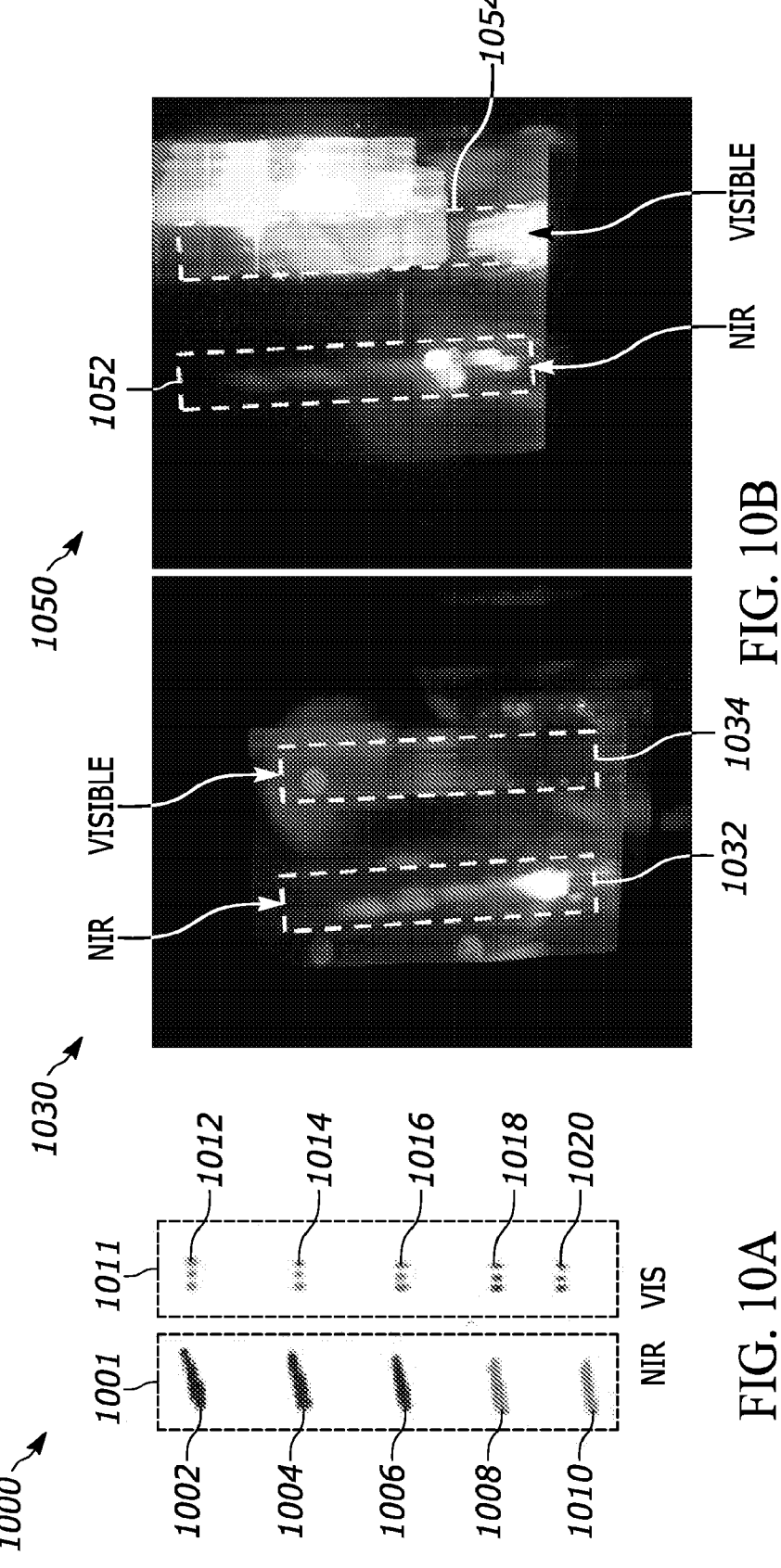
FIG. 10A illustrates results of a model of the modulator plane in an embodiment of a near-IR extended spectral shaper of the present teaching.
FIG. 10B illustrates photographs of the modulator plane for two measurements of embodiments of a near-IR extended spectral shaper of the present teaching.

FIG. 10A illustrates the results of a Zemax™ model simulator output 1000 of the modulator plane in an embodiments of a near-IR extended spectral shaper system of the present teaching. The NIR region 1001 of the modulator shows illumination patterns 1002, 1004, 1006, 1008, 1010 for five different individual NIR wavelengths with a line shape that is slightly tilted as a result of some aberration in the imaging dispersive element because of the offset placement of the input NIR point source at the NIR input plane. The visible region 1011 of the modulator shows illumination patterns 1012, 1014, 1016, 1018, 1020 for five different individual visible wavelengths with a higher-resolution image of a three-element linear fiber array input at the visible input plane, as imaged by the imaging dispersive element with aberration correction. The Model 1000 shows a clear gap between individual NIR spectral images 1002, 1004, 1006, 1008, 1010 and visible images 1012, 1014, 1016, 1018, 1020.

FIG. 10B illustrates photographs 1030, 1050 of the modulator plane for two measurements of embodiments of a near-IR extended spectral shaper system of the present teaching. The NIR regions 1032, 1052 and the visible regions 1034, 1054 of the modulator for each photograph 1030, 1050 are indicated. Each photograph is illuminated with different input illumination that extends from the visible through the NIR portion of the spectrum. The entire spectrum of illumination for each measurement is shown in the photographs 1030, 1050. The illumination for the entire measured spectrum shares the same imaging dispersive element and all spectral components separated by the dispersive element fall onto the same modulator element. A clear spatial gap is apparent between the illuminated regions 1032, 1034 in the first photograph 1030 and also between the illuminated regions 1052, 1054 in the second photograph 1050. This is necessary to provide independent spectral control for the NIR regions 1032, 1052 and the visible regions 1034, 1054. For modulators that are pixelated modulators with a two dimensional array of pixels, it is clear that the pixels for the NIR region 1032, 1052 are different from the pixels for the visible region 1034, 1054. It is also clear that individual spectral components of the visible and/or the NIR regions are distinct, and also can be independently controlled by controlling different regions of pixels on the pixelated modulator.

Figure 11A:
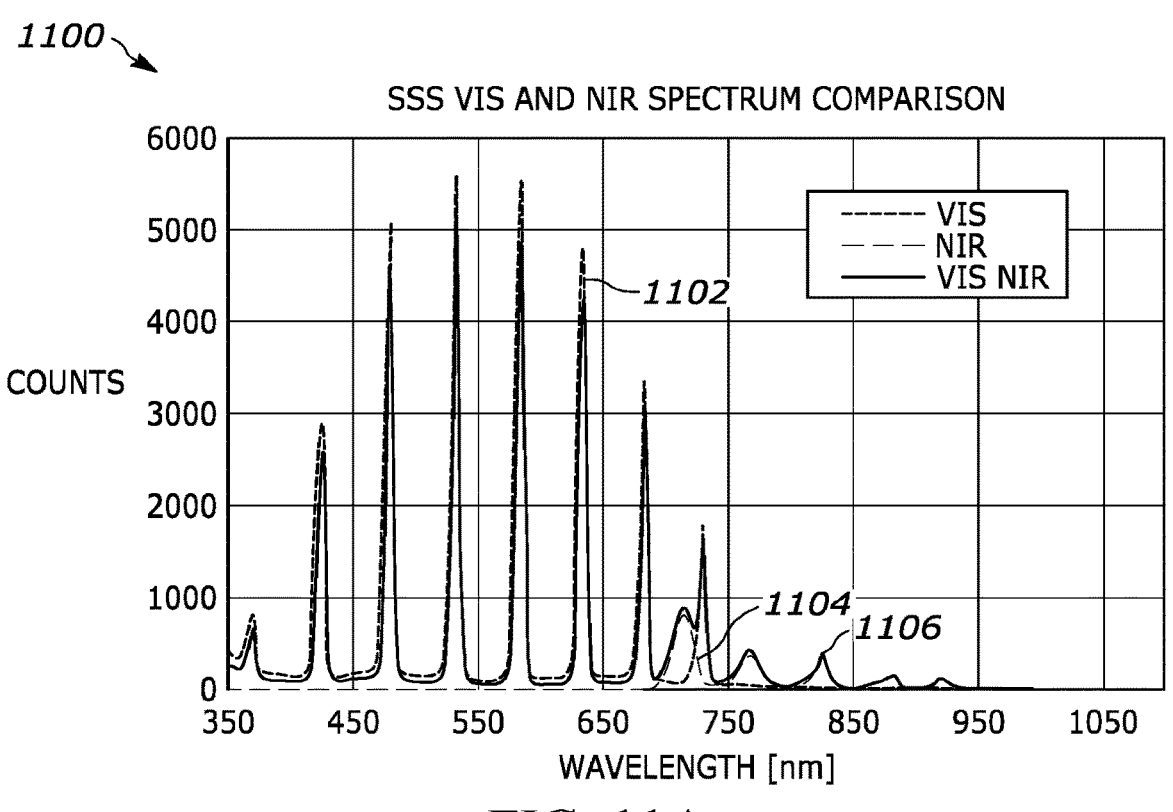
FIG. 11A illustrates a graph of spectra from an embodiment of the spectral shaper of the present teaching with particular rows of mirrors configured in the "on state" and showing a comparison of the visible spectrum and the NIR spectrum.

FIG. 11A illustrates a graph 1100 of spectra from an embodiment of the spectral shaper system of the present teaching with rows of mirrors configured in the "on state" showing a comparison of the visible spectrum and the NIR spectrum. The spectral shaper system used for these measurements included a DMD with micro-mirrors as pixels at the modulator plane. These measurements were taken at the output of a liquid light guide that was optically coupled to the output of the spectral shaper system. For this measurement, eight rows of mirrors, with each row having a five-mirror width, was turned on. The visible spectrum 1102 is shown in short dashed line and the NIR spectrum 1104 is shown in a longer dash line. The combined spectrum 1106 is also shown with a solid line. The eight peaks apparent in the visible spectrum 1102 have a small full width at half maximum (FWHM). Five of the eight peaks of the NIR spectrum 1104 have lower counts and slightly broader FWHM. Some imbalance of the intensity of the spectra in the graph 1100 are due to attenuation in the liquid light guide, which has low transmission for wavelengths greater than 730 nm that collected the output light.

Figure 11B:
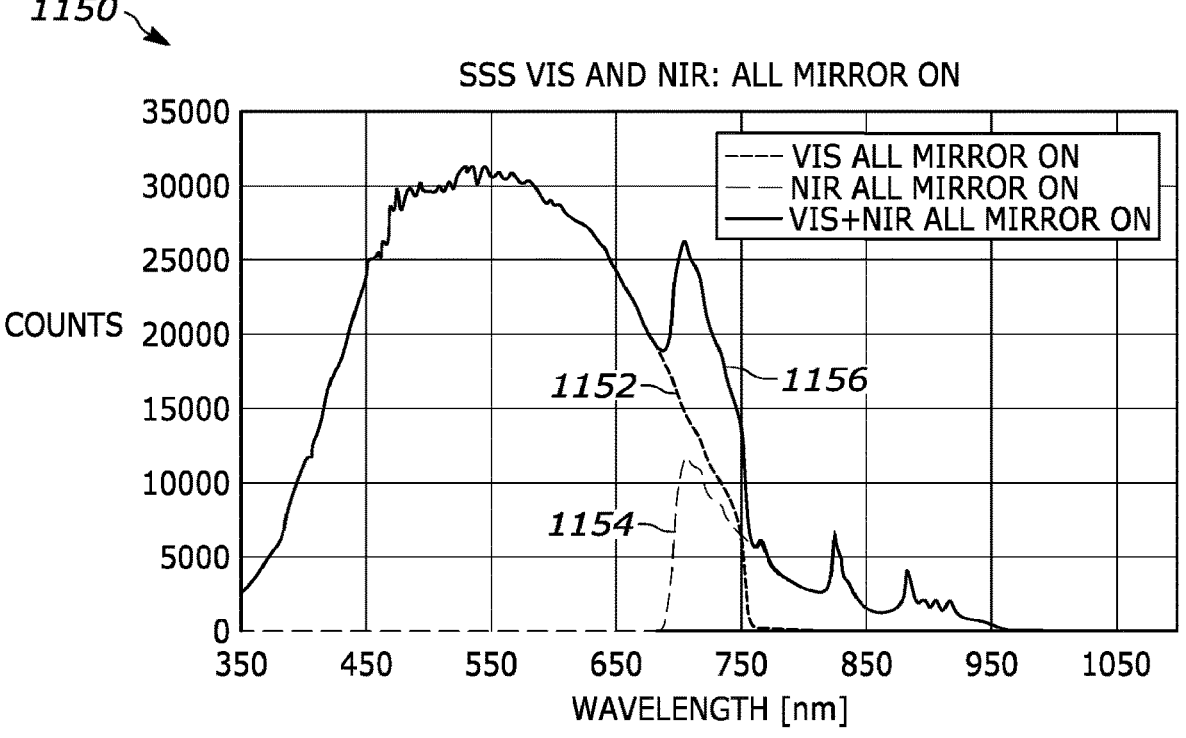
FIG. 11B illustrates a graph of spectra from the embodiment of the spectral shaper system of FIG. 11A showing the output with all the mirrors in the "on state" for the visible spectrum and/or the NIR spectrum.

FIG. 11B illustrates a graph 1150 of spectra from the spectral shaper system described in connection with of FIG. 11A showing the output with all the mirrors in the "on state" for the visible spectrum and/or the NIR spectrum. The visible spectrum 1152 with all mirrors in the "on state" in the visible region of the modulator is shown in short dashed line and the NIR spectrum 1154 with all mirrors in the "on state" in the NIR region is shown in a longer dash line. The combined spectrum 1156 with all mirrors in the "on state" in both regions is also shown with a solid line. With all mirrors in the "on state", the output exhibits a higher count rate with individual spectral components not distinguished, and the total wavelength range is lower than the rows in on state of graph 1100.

Figures 12A, 12B:
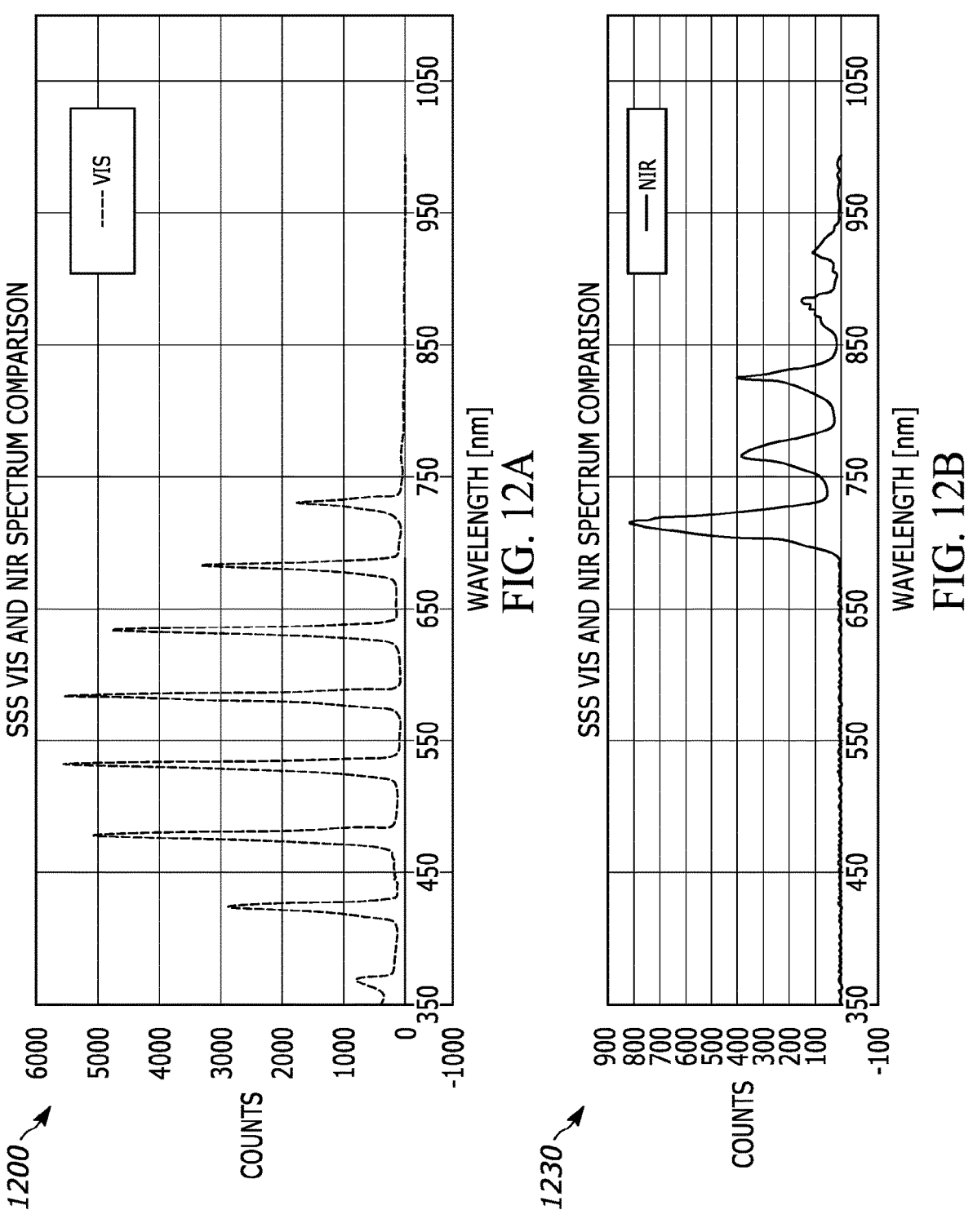
FIG. 12A illustrates a graph of a spectrum from an embodiment of the spectral shaper system of the present teaching with particular rows of mirrors in the visible region in the on state.
FIG. 12B illustrates a graph of a spectrum from an embodiment of the spectral shaper system of the present teaching with particular rows of mirrors in the NIR region in the on state.

FIG. 12A illustrates a graph 1200 of a spectrum from an embodiment of the spectral shaper system of the present teaching with rows of mirrors in the "on state" in the visible region. This graph shows results with eight rows of five mirror with each mirror in the "on state". The high resolution provided by the aberration-corrected imaging is illustrated by the small FWHM.

FIG. 12B illustrates a graph 1230 of a spectrum from an embodiment of the spectral shaper of the present teaching with rows of mirrors in the NIR region in the on state. The NIR peaks have a wider FWHM.

Figure 12C:
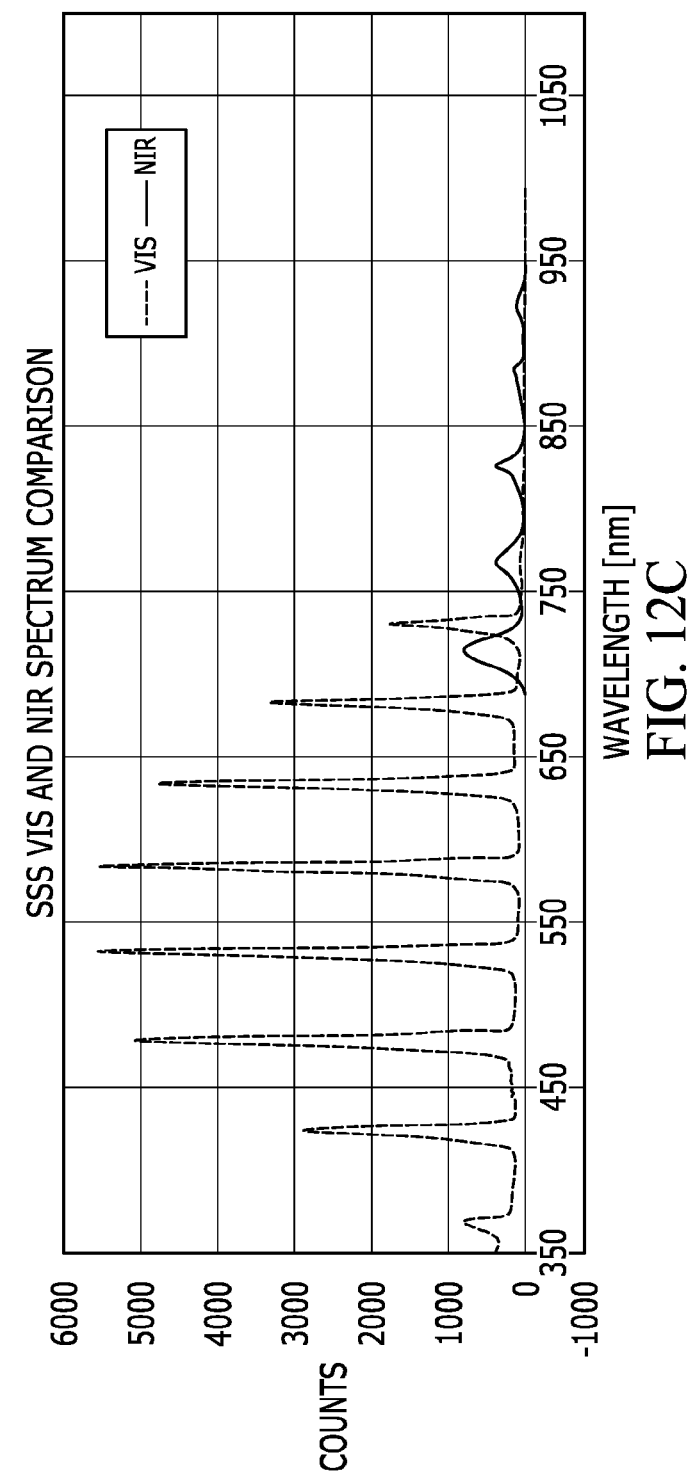
FIG. 12C illustrates a graph of the spectra of FIGS. 12A and 12B on a shared axis.

FIG. 12C illustrates a graph 1250 of both the visible spectrum and the NIR spectrum of FIGS. 12A and 12B on the same plot. The comparison shows lower throughput for the NIR light, and the larger FWHM. The liquid light guide used for this measurement had low transmission for the NIR region, but extended transmission liquid light guides are available with over 70% transmission throughout the near infrared region. Throughput of the spectral shaping system can be improved by extending the reflectivity of the imaging dispersive device by using, for example, a gold coated reflective surface that can result in as much as 10% higher flux. Also, changes in the aberration condition can modify the tilt of the individual lines in the NIR spectrum.

Figures 13A, 13B:
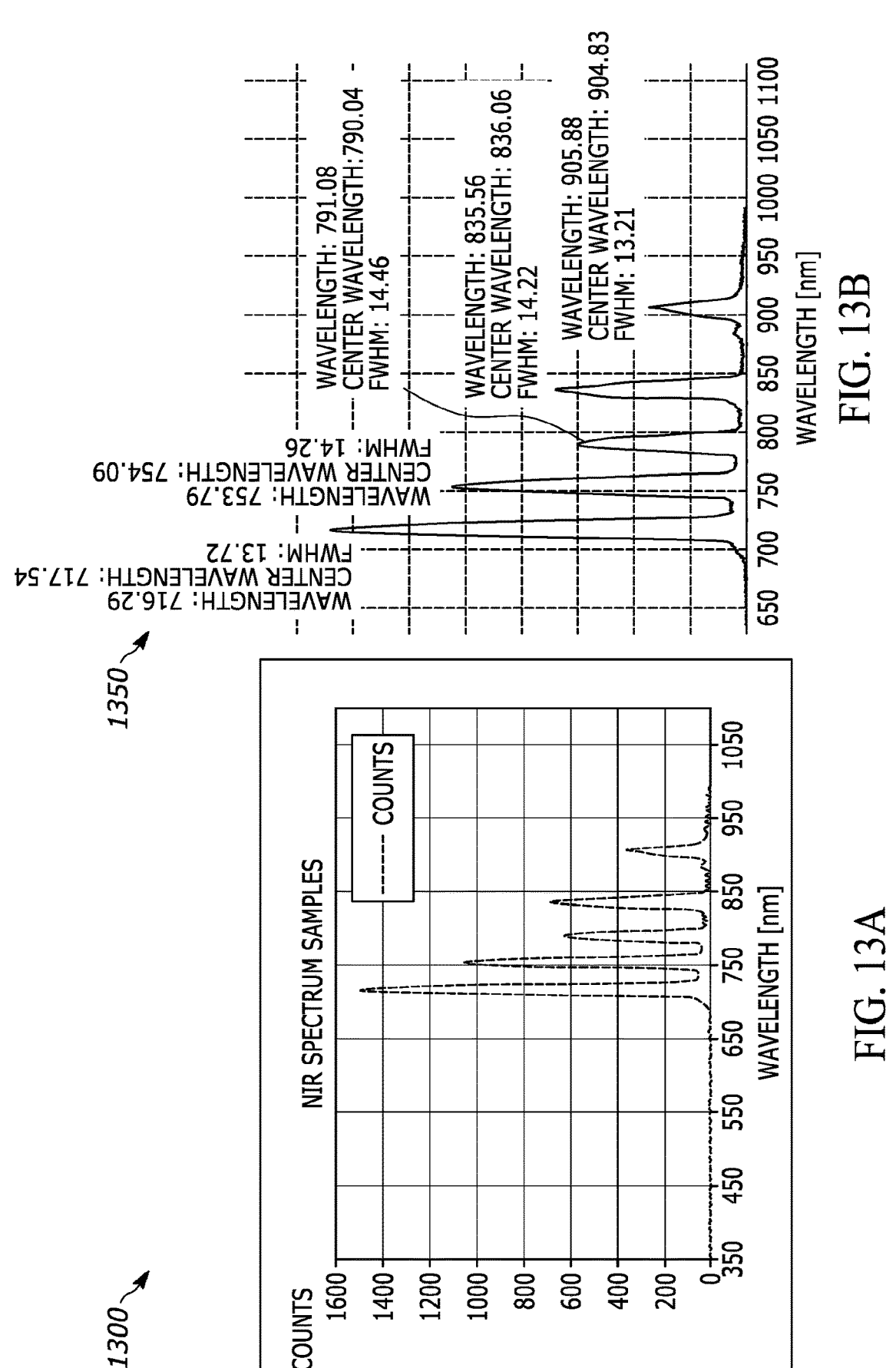
FIG. 13A illustrates a graph of a spectrum from an embodiment of the spectral shaper system of the present teaching with five peaks in the NIR region using five rows of mirrors in the NIR region in the on state.
FIG. 13B illustrates a graph of the spectrum of FIG. 13A with calculated FWHM information.

FIG. 13A illustrates a graph 1300 of a spectrum from an embodiment of the spectral shaper system of the present teaching with five peaks in the NIR region using five rows of mirrors in the "on state" in the NIR region. The sample peaks are at 716 nm, 754 nm, 791 nm, 835 nm and 905 nm.

FIG. 13B illustrates a graph 1350 of the spectrum of FIG. 13B with calculated FWHM information. The peak at 716 nm has a FWHM of 13.72 nm. The peak at 754 nm has a FWHM of 14.26 nm. The peak at 791 nm has a FWHM of 14.46 nm. The peak at 835 nm has a FWMH of 14.22 nm. The peak at 905 nm has a FWHM of 13.21 nm. Thus, the FWHM ranges from 13 nm to 14 nm.

One feature of the present teaching is that it is possible to have both the NIR optical source light and the visible source light be generated by the same optical source. The optical source is constructed so that the visible source light is provided at a plane consistent with the visible input plane of the spectral shaper and the NIR source light is provided at a plane consistent with the NIR input plane of the spectral shaper as described herein. One advantage of this embodiment is that both complexity and cost are reduced by using a single source to power both the visible and NIR illumination. This design makes it possible to provide a compact NIR-extended programmable light source using the spectral shaping system.

Figure 14A:
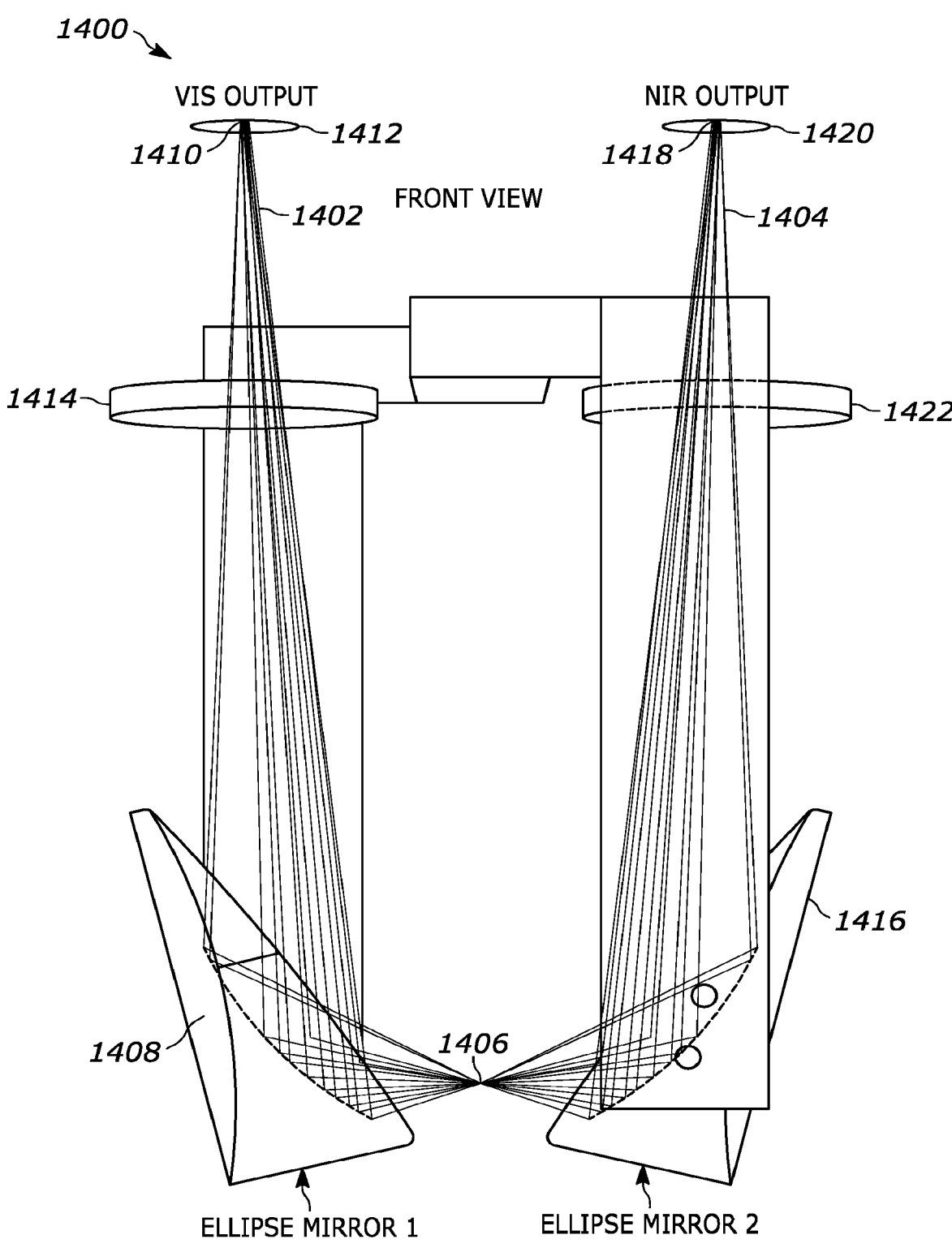
FIG. 14A illustrates a front view of an optical source that generates visible light and NIR optical light from a broadband point source of light.

FIG. 14A illustrates a front view 1400 of an optical source that generates visible light 1402 and NIR optical light 1404 from a broadband point source 1406 of light. The broadband point source 1406 of light can be, for example, generated by a high-intensity plasma of a laser driven light source. A first elliptical mirror 1408 reflects and focuses light from the point source 1406 to a visible output 1410 optical beam with a desired shape at a visible output plane 1412. A short pass filter 1414 is positioned in the path of the light reflected from the first elliptical mirror 1408. A second elliptical mirror 1416 reflects and focuses light from the point source 1406 to a NIR output 1418 optical beam with a desired shape at a NIR output plane 1420. A long pass filter 1422 is positioned in the path of the light reflected from the second elliptical mirror 1416. The shape of the visible output 1410 and the shape of the NIR output 1418 is elliptical, which, when coupled into the spectral shaper, serves to balance and smooth the spectrum of the visible and NIR parts of the spectrum at the shaper output.

Figure 14B:
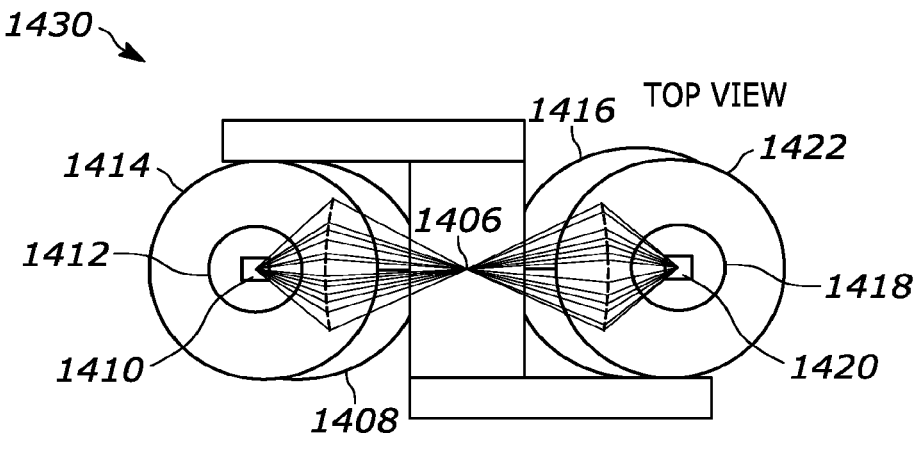
FIG. 14B illustrates a top view of the optical source of FIG. 14A that generates visible light and NIR optical light.

FIG. 14B illustrates a top view 1430 of the optical source that generates visible light 1402 and NIR optical light 1404 of FIG. 14A. The first and second elliptical mirrors 1408, 1416, short-pass filter 1414 and long pass filter 1422 are shown as well as the visible output plane 1412 and the NIR output plane 1420.

Figure 14C:
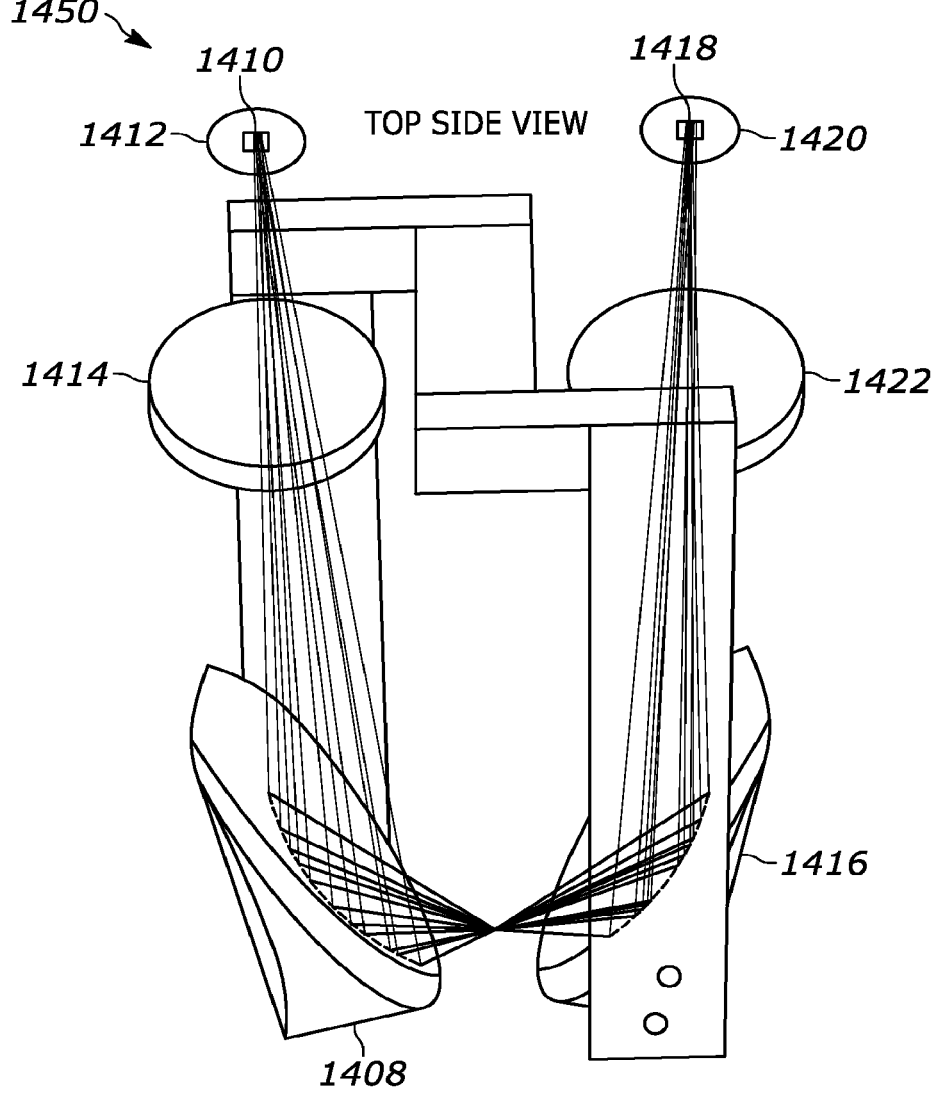
FIG. 14C illustrates a side top view of the optical source of FIG. 14A that generates visible light and NIR optical light.

FIG. 14C illustrates a side top view 1450 of the optical source that generates visible light 1402 and NIR optical light 1404 (FIG. 14A). The first and second elliptical mirrors 1408, 1416, short-pass filter 1414 and long pass filter 1422 are shown as well as the visible output plane 1412 and the NIR output plane 1420.

In various embodiments, the relative flux from the visible and NIR optical illumination can be achieved based on the reflectivity of various components used in the source. For example, it is possible to have nominally the same flux level for each channel of visible and/or NIR light. It is also possible to have higher flux in either the visible or the NIR regions. For example, using gold coating on reflective surfaces increases reflected flux of the infrared light. For example, a long-pass filter can flatten the Xenon spectrum response, reducing the peaks of Xenon spectrum in the near infrared. These two aspects can help improve the balance of the NIR part of the spectrum, especially as compared to the visible part of the spectrum of the output light of the optical source. For the visible light path, some embodiments use a first elliptical mirror 1408 with an enhanced aluminum coating and a short pass filter 1414 with a cutoff at 760 nm. For the NIR light path, some embodiments use a second elliptical mirror 1416 with an enhanced gold coating and a long-pass filter 1422 with a cutoff at 740 nm wavelength.

Figure 15:
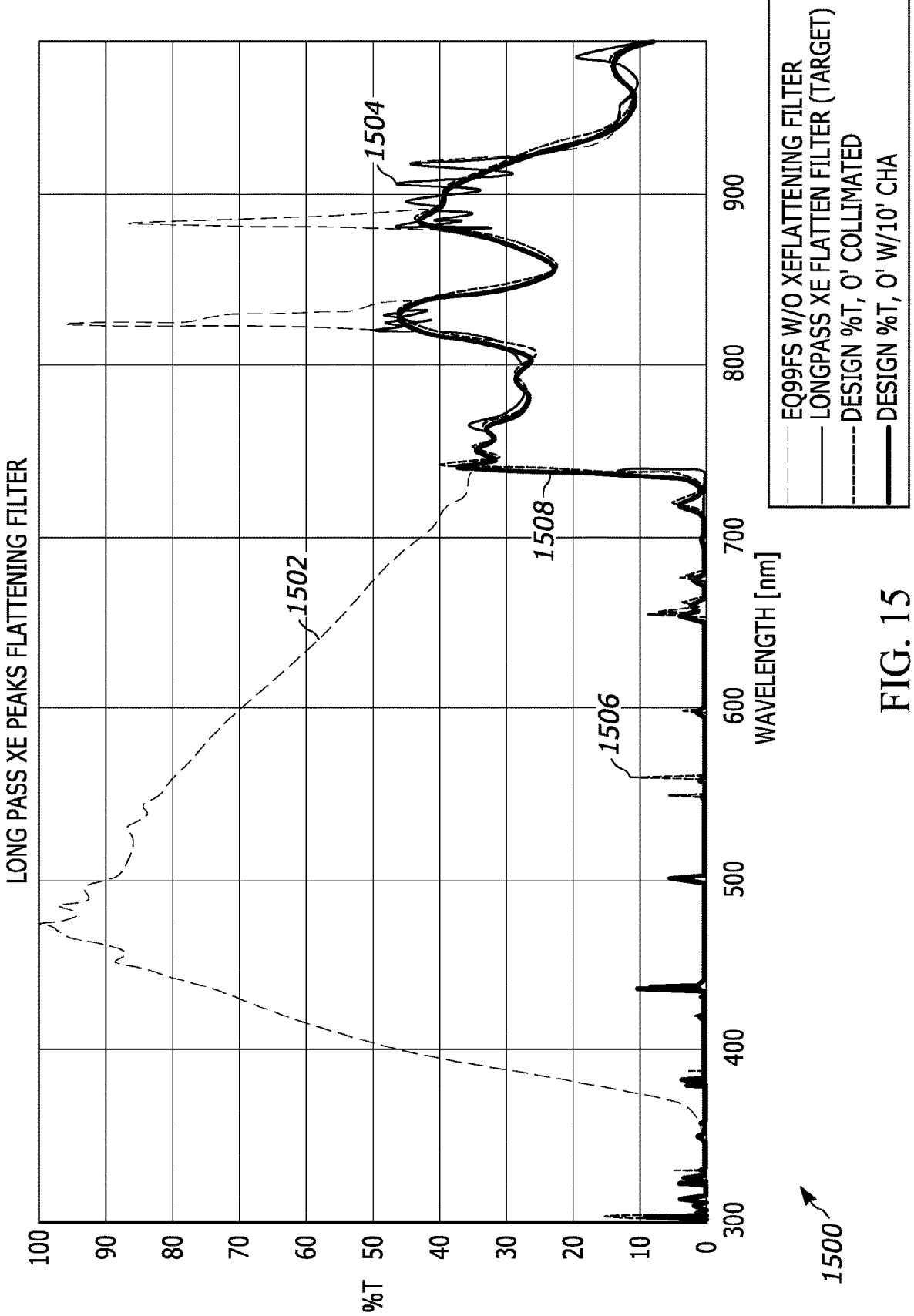
FIG. 15 illustrates a graph of spectra of the output for different embodiments of the optical source for a spectral shaper system according to present teaching that use different filters and/or mirror coatings on the optical elements and a Xenon-based high-brightness plasma to generate the point source illumination.

FIG. 15 illustrates a graph 1500 of spectra of the output for different embodiments of the optical source for a spectral shaper system of the present teaching that use different filters and/or mirror coatings on the optical elements and a Xenon-based high-brightness plasma to generate the point source illumination. The first spectrum 1502 illustrates the output of the Xenon plasma, with high peaks in the near infrared region. The second spectrum 1504 illustrates the reduction of the NIR peaks using a long pass Xenon spectrum flattening filter with a cutoff wavelength of 740 nm.

Figure 16:
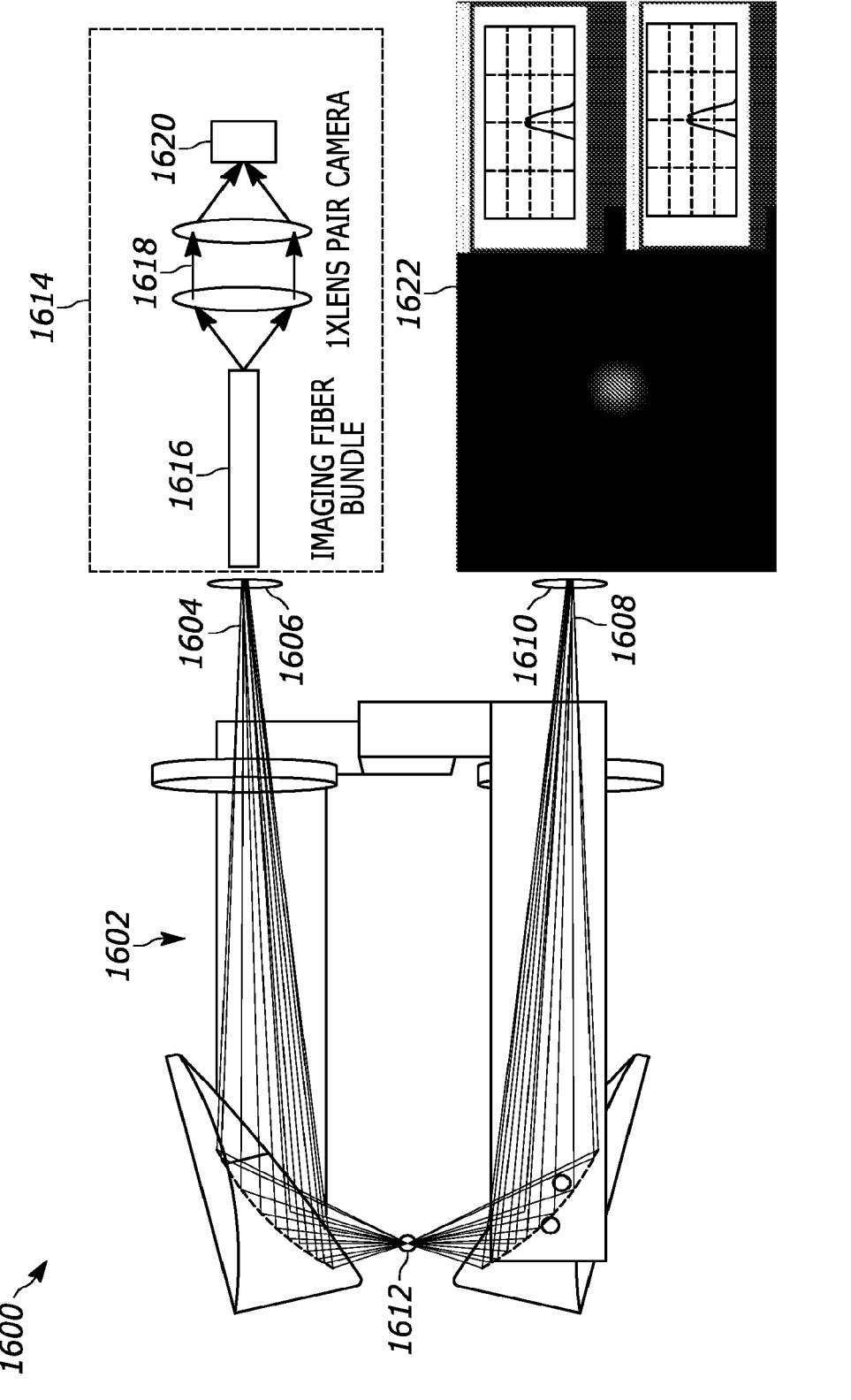
FIG. 16 illustrates an alignment and characterization system for an optical source for the spectral shaper system of the present teaching.

FIG. 16 illustrates an alignment and characterization system 1600 for an optical source 1602 for the spectral shaper system of the present teaching. An optical point source 1612 generates visible light 1604 at a visible output plane 1606 and NIR optical light 1608 at a NIR output plane 1610 from the optical point source 1612. The optical point source 1612 for this embodiment is a high-intensity Xenon plasma driven by a laser. The visible light 1604 at a visible output plane 1606 and NIR optical light 1608 at a NIR output plane 1610 have nominally elliptical shapes. The visible light 1604 or the NIR light 1608 is coupled into an alignment tool 1614 that includes an imaging fiber bundle 1616 and a one-times magnifying lens pair 1618 that images the bundle onto a camera 1620. A position of either the visible beam or the NIR beam on the camera is used to adjust the respective elliptical mirrors. As an example, if the optical point source 1612 has a plasma size of between 80 to 240 micrometers, it is imaged by a three-factor ellipsoidal mirror to a size between 240 and 720 micrometers at the output planes 1606, 1608. The inset picture 1622 shows a point source generated by an optical fiber as imaged at the camera to show the operation of the alignment tool 1614 in an ideal case.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A spectrally-shaped source comprising:
a near infrared optical source that generates a near infrared optical beam;
a near infrared light input positioned at a near infrared input plane that receives the near infrared optical beam;
a visible to ultraviolet optical source that generates a line-shaped visible to ultraviolet optical beam;
a visible to ultraviolet light input positioned at a visible to ultraviolet input plane that receives the line-shaped visible to ultraviolet optical beam;
an image forming grating positioned in a path of the near infrared optical beam and the line-shaped visible to ultraviolet optical beam, the image forming grating spatially separating a spectrum of light in the near infrared optical beam and a spectrum of light the line-shaped visible to ultraviolet optical beam into spatially separated beams and imaging the line-shaped visible to ultraviolet optical beam to a modulator plane such that the spatially separated beams of the spatially-separated near infrared spectrum is parallel to the spatially separated beams of the spatially-separated visible to ultraviolet spectrum, wherein the near infrared input plane, the visible to ultraviolet input plane, and the modulator plane are different planes and the path of the near infrared optical beam and the path of the line-shaped visible to ultraviolet optical beam is a same optical path;
a pixelated spatial light modulator positioned in the modulation plane, the pixelated spatial light modulator comprising an array of pixels that are illuminated by the spatially separated beams separated by the image forming grating such that each column of illuminated pixels in the array of pixels is illuminated by a different spectral segment of light formed in an image of the line-shaped visible to ultraviolet optical beam such that the image of the line-shaped visible to ultraviolet optical beam matches a shape of a column of pixels; and toroidal optics positioned after the pixelated spatial light modulator and being configured to collect and focus the optical beam from the modulation plane formed in the image of the line-shaped visible to ultraviolet optical beam to an output plane of the spectrally-shaped source and to focus the spatially separated beams such that they overlap at the output plane, the toroidal optics projecting a selected portion of the optical beam from the modulation plane formed in the image of the line-shaped visible to ultraviolet optical beam that is reflected toward the toroidal optics by the pixelated spatial light modulator to provide an output optical illumination at an output of the spectrally-shaped source that is positioned at the output plane.

2. The spectrally-shaped source of claim 1 wherein the optical source comprises a laser driven light source.

3. The spectrally-shaped source of claim 1 wherein the optical source comprises a super continuum fiber laser.

4. The spectrally-shaped source of claim 1 wherein the image forming grating comprises a single optical element.

5. The spectrally-shaped source of claim 1 wherein the toroidal optics comprises a single optical element.

6. The spectrally-shaped source of claim 1 wherein the image forming grating is configured to provide aberration correction of the spectrally-shaped source.

7. The spectrally-shaped source of claim 1 wherein the pixelated spatial light modulator comprises a digital micro-mirror device.

8. The spectrally-shaped source of claim 1 wherein the pixelated spatial light modulator comprises a liquid crystal device.

9. The spectrally-shaped source of claim 1 further comprising a liquid light guide optically coupled to the output of the spectrally-shaped source.

10. The spectrally-shaped source of claim 1 further comprising a spectral extension source that generates light in a desired spectrum and an optical coupler that couples the generated light in the desired spectrum to the output of the spectrally shaped source.

11. The spectrally-shaped source of claim 10 wherein the spectral extension source comprises one or more NIR LED.

12. The spectrally-shaped source of claim 1 wherein the pixelated spatial light modulator further comprises an order-sorting filter.

13. A method of spectrally shaping, the method comprising:

generating a near infrared optical beam at a near infrared input plane;

generating a line-shaped visible to ultraviolet optical beam at a visible to ultraviolet input plane;

spatially separating a spectrum of light in the near infrared optical beam and a spectrum of light in the line-shaped visible to ultraviolet optical beam into spatially separated beams and imaging the line-shaped visible to ultraviolet optical beam to a spatial light modulator plane such that the near infrared spectrum is parallel to the visible to ultraviolet spectrum, wherein the near infrared input plane, the visible to ultraviolet input plane, and the modulator plane are different planes and the path of the near infrared optical beam and the path of the line-shaped visible to ultraviolet optical beam is a same optical path;

spatially modulating the imaged spatially separated spectrum of light in the near infrared optical beam and the spatially separated spectrum of light in the line-shaped visible to ultraviolet optical beam using a pixelated spatial light modulator so that the pixelated spatial light modulator reflects a desired selected portion of the imaged spatially separated spectrum of light in the near infrared optical beam and the spatially separated spectrum of light in the line-shaped visible to ultraviolet optical beam toward toroidal optics, wherein a column of pixels in the spatial light modulator array selectively reflects a desired portion of light illuminating the column of pixels toward the toroidal optic; and projecting the selected portion of the imaged spatially separated spectrum of light in the near infrared optical beam and the spatially separated spectrum of light in the line-shaped visible to ultraviolet optical beam with the toroidal optics to an output.

14. The method of claim 13 wherein the spatial modulating is performed to reflect the desired selected portion of the optical beam toward the toroidal optic so that at least two columns of pixels in the array of pixels are illuminated at a same height.

15. The method of claim 13 wherein the spatial modulating is performed so that a desired spectral shape of the output optical illumination is provided.

16. The method of claim 13 further comprising coupling light from a spectral extension source with a desired spectrum to the output.

17. The method of claim 16 wherein the desired spectrum is in the near infrared region of the spectrum.

18. The spectrally-shaped source of claim 1 wherein the visible to ultraviolet light source comprises a multi-strand fiber bundle.

19. The spectrally-shaped source of claim 1 wherein the near infrared optical source comprises a point source.

* * * * *